United States Patent
Sun et al.

(10) Patent No.: US 7,237,145 B2
(45) Date of Patent: *Jun. 26, 2007

(54) FAULT-TOLERANT ARCHITECTURE FOR IN-CIRCUIT PROGRAMMING

(75) Inventors: Albert C. Sun, Neihu (TW); Chee H. Lee, San-Chung (TW); Chang L. Chen, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 809 days.

This patent is subject to a terminal disclaimer.

(21) Appl. No.: 10/408,591

(22) Filed: Apr. 7, 2003

(65) Prior Publication Data

US 2004/0030953 A1 Feb. 12, 2004

Related U.S. Application Data

(63) Continuation of application No. 10/097,839, filed on Mar. 13, 2002, now abandoned, which is a continuation of application No. 09/925,920, filed on Aug. 9, 2001, now Pat. No. 6,401,221, which is a continuation of application No. 09/029,118, filed as application No. PCT/US97/13848 on Aug. 6, 1997, now Pat. No. 6,282,675, application No. 10/408,591, which is a continuation-in-part of application No. 10/314,638, filed on Dec. 9, 2002, now Pat. No. 6,842,820, which is a continuation of application No. 09/525,835, filed on Mar. 15, 2000, now Pat. No. 6,493,788, which is a continuation of application No. 08/952,045, filed as application No. PCT/US96/17302 on Oct. 28, 1996, now Pat. No. 6,151,657.

(51) Int. Cl.
*G06F 11/00* (2006.01)

(52) U.S. Cl. .......................................... 714/15

(58) Field of Classification Search .................. 714/2, 714/15, 23, 27, 51
See application file for complete search history.

(56) References Cited

U.S. PATENT DOCUMENTS 4,491,914 A 1/1985 Sujaku (Continued)

FOREIGN PATENT DOCUMENTS

EP 0 632 629 1/1995

(Continued)

OTHER PUBLICATIONS

Excerpts from 3048 Hardware Manual, dated 1995, consisting of pp. 577-582.

(Continued)

*Primary Examiner*—Bryce P. Bonzo
(74) *Attorney, Agent, or Firm*—Mark Haynes; Haynes Beffel & Wolfeld LLP

(57) ABSTRACT

The present invention provides a method and apparatus for providing fault-tolerance for in-circuit programming systems. The invention operates by storing a minimal set of code to initialize the in-circuit programming process in a protected memory so that if the in-circuit programming process fails, the in-circuit programming process can be restarted from the protected memory. This type of fault-tolerance is especially important in systems which allow the code which accomplishes the in-circuit programming to be modified by the in-circuit programming process. One embodiment of the present invention provides a multiplexer to selectively switch between a normal boot code sequence and a protected boot code sequence, as well as a watchdog timer to monitor the in-circuit programming process to determine whether the in-circuit programming process is not progressing properly.

18 Claims, 16 Drawing Sheets

U.S. PATENT DOCUMENTS

| | | | |
|---|---|---|---|
| 4,794,558 A | 12/1988 | Thompson | |
| 4,805,109 A | 2/1989 | Kroll et al. | |
| 5,018,096 A | 5/1991 | Aoyama | |
| 5,163,147 A | 11/1992 | Orita | |
| 5,233,613 A | 8/1993 | Allen et al. | |
| 5,247,659 A | 9/1993 | Curran et al. | |
| 5,257,378 A | 10/1993 | Sideserf et al. | |
| 5,276,839 A | 1/1994 | Robb et al. | |
| 5,278,976 A | 1/1994 | Wu | |
| 5,349,697 A | 9/1994 | Pelkonen | |
| 5,388,267 A | 2/1995 | Chan et al. | |
| 5,404,494 A | 4/1995 | Garney | |
| 5,432,927 A * | 7/1995 | Grote et al. | 713/2 |
| 5,444,664 A | 8/1995 | Kuroda et al. | |
| 5,444,861 A | 8/1995 | Adamec et al. | |
| 5,467,286 A | 11/1995 | Pyle et al. | |
| 5,473,758 A | 12/1995 | Allen et al. | |
| 5,495,593 A | 2/1996 | Elmer et al. | |
| 5,504,903 A | 4/1996 | Chen et al. | |
| 5,564,032 A | 10/1996 | Aota et al. | |
| 5,566,335 A | 10/1996 | Nash et al. | |
| 5,568,641 A | 10/1996 | Nelson et al. | |
| 5,574,926 A | 11/1996 | Mizazawa et al. | |
| 5,579,479 A | 11/1996 | Plum | |
| 5,581,723 A | 12/1996 | Hasbun et al. | |
| 5,603,056 A | 2/1997 | Totani | |
| 5,687,345 A | 11/1997 | Matsubara et al. | |
| 5,699,511 A | 12/1997 | Porcaro et al. | |
| 5,701,492 A | 12/1997 | Wadsworth et al. | |
| 5,826,075 A * | 10/1998 | Bealkowski et al. | 713/187 |
| 5,835,761 A | 11/1998 | Ishii et al. | |
| 5,844,843 A | 12/1998 | Matsubara et al. | |
| 5,901,330 A | 5/1999 | Sun et al. | |
| 5,940,074 A | 8/1999 | Britt, Jr. et al. | |
| 5,987,605 A | 11/1999 | Hill et al. | |
| 6,009,495 A | 12/1999 | DeRoo et al. | |
| 6,009,540 A | 12/1999 | Craft et al. | |
| 6,073,207 A | 6/2000 | Ideta | |
| 6,079,016 A | 6/2000 | Park | |
| 6,131,159 A | 10/2000 | Hecht et al. | |
| 6,151,657 A | 11/2000 | Sun et al. | |
| 6,166,953 A | 12/2000 | Matsubara | |
| 6,181,598 B1 | 1/2001 | Matsubara et al. | |
| 6,205,548 B1 | 3/2001 | Hasbun | |
| 6,223,284 B1 | 4/2001 | Novoa et al. | |
| 6,275,931 B1 | 8/2001 | Narayanaswamy et al. | |
| 6,401,221 B1 | 6/2002 | Sun et al. | |
| 6,493,788 B1 | 12/2002 | Sun et al. | |

FOREIGN PATENT DOCUMENTS

| | | |
|---|---|---|
| EP | 0 681 298 | 11/1995 |
| JP | 06019719 A | 1/1994 |
| JP | 08030450 A | 2/1996 |

OTHER PUBLICATIONS

Hitachi Single-Chip Microcomputer H8/3048 Series Hardware Manual, Jan. 1995, pp. 1, 423-424, 535, 552-553, 565-566, 571 and 604.

"MC68HC11 EEPROM Programming From a Personal Computer" AN1010, 1988 Motorola Semiconductor Application Note, pp. 1-12.

* cited by examiner

FAULT-TOLERANT ARCHITECTURE FOR IN-CIRCUIT PROGRAMMING

CROSS-REFERENCE TO RELATED APPLICATIONS

This application is a continuation application of application Ser. No. 10/097,839 filed 13 Mar. 2002 now abandoned, which is a continuation of application Ser. No. 09/925,920 filed 9 Aug. 2001, now U.S. Pat. No. 6,401,221; which is a continuation application of application Ser. No. 09/029,118 filed 23 Feb. 1998, now U.S. Pat. No. 6,282,675; which is the national stage filing of International Application No. PCT/US97/13848, filed 6 Aug. 1997.

This application is also a continuation-in-part of application Ser. No. 10/314,638 filed 9 Dec. 2002 now U.S. Pat. No. 6,842,820; which is a continuation of application Ser. No. 09/525,835 filed 15 Mar. 2000, now U.S. Pat. No. 6,493,788; which is a continuation of application Ser. No. 08/952,045 filed 3 Oct. 1997, now U.S. Pat. No. 6,151,657; which is the national stage filing of International Application No. PCT/US96/17302 filed 28 Oct. 1996.

This application is related to international application No. PCT/US96/17302, entitled, "PROCESSOR WITH EMBEDDED IN-CIRCUIT PROGRAM STRUCTURES," filed 28 Oct. 1996 by applicants Macronix International Co., Ltd., for all states other than the United States, and Albert C. Sun, Chee H. Lee and Chang L. Chen for the United States. This application hereby incorporates by reference this prior application to the extent that it has not been bodily incorporated herein.

This application is also related to international application No. PCT/US97/05622, entitled, "IN-CIRCUIT PROGRAMMING ARCHITECTURE WITH ROM AND FLASH MEMORY," filed 3 Apr. 1997 by applicants Macronix International Co., Ltd., for all states other than the United States, and Albert C. Sun, Chee H. Lee and Chang L. Chen for the United States. This application hereby incorporates by reference this prior application to the extent that it has not been bodily incorporated herein.

This application is further related to International Application No. PCT/US96/17302 entitled PROCESSOR WITH EMBEDDED IN-CIRCUIT PROGRAMMING STRUCTURES, filed 28 Oct. 1996 by applicant Macronix International Co., Ltd., for all states other than the United States, and by applicants Albert C. Sun, Chee H. Lee and Chang L. Chen for the United States.

COPYRIGHT NOTICE PURSUANT 37 C.F.R. 1.71(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to a computer system having non-volatile memory for storing sequences of instructions for execution by a processor in the computer system, and more particularly to fault-tolerance techniques for in-circuit programming to update and modify sequences of instructions stored in non-volatile memory.

The present invention further relates to integrated circuits having a non-volatile memory for storing sequences of instructions for execution by a processor on the integrated circuit; and more particularly to techniques for accomplishing in-circuit programming to update and modify the stored sequences of instructions.

2. Related Art

Integrated circuit microcontrollers have been developed which include arrays of non-volatile memory on an integrated circuit for storing sequences of instructions to be executed by a microcontroller. The sequences of instructions are stored in read-only memory (ROM), which must be programmed during manufacture of a device, and cannot be updated. The sequences of instructions can also be stored in an EPROM array. However, this approach requires special hardware to program the EPROM array before the device is placed in a circuit. In yet other systems, EEPROM memory is used for storing instructions. EEPROM has the advantage that it can be programmed much more quickly than EPROM, and can be modified on the fly. In yet another approach, flash memory is used to store instructions. This allows for higher density and higher speed reprogramming of the non-volatile memory. When a device combines a reprogrammable non-volatile memory, such as EEPROM or a flash memory, with a microcontroller, the device can be reprogrammed while it is in a circuit, allowing for in-circuit programming based on interactive algorithms.

The ability to interactively download instruction and data to a remote device can be very valuable in a network environment. For example, a company can service a customer's equipment without requiring the customer to bring the equipment to a service center. Rather, the company can execute diagnostic functions using the in-circuit programming capability of the customer's equipment across a communication channel such as the Internet or telephone lines. In this way, software fixes can be downloaded to a customer's equipment, and the equipment can be reenabled with corrected or updated code.

Example prior devices which include this capability include the AT89S8252 microcontroller, manufactured by Atmel of San Jose, Calif., and the P89CE558 single chip microcontroller, manufactured by Philips Semiconductors of Eindhoven, The Netherlands. According to the architecture of the Philips P89CE558 microcontroller, mask ROM is utilized for the in-circuit programming (ICP) set of instructions, which are used by the microcontroller to update flash memory on the chip. Thus, the Philips microcontroller requires a dedicated mask ROM module to store fixed ICP code for each individual environment. In order to adapt the ICP code for a particular environment, the environment must be known before manufacturing of the device is complete so that the mask ROM can be properly coded. Furthermore, the ICP communication channel is fixed to a serial RS232 port in the Philips microcontroller. This limits the use of the microcontroller to a relatively narrow range of applications, and makes it difficult to utilize the ICP function in a dynamic communication environment, where the serial port may not match well with the communication channel across which the updated software is provided.

According to the architecture of the Atmel AT89S8252 microcontroller, a dedicated serial peripheral interface (SPI) port on the chip is used for the updating of flash memory. This SPI port has the disadvantage that it is implemented with inflexible program logic; modification of the in-circuit programming technique cannot be accomplished because of the inflexibility of the SPI port. The Atmel chip has further disadvantages; complicated hardware must be added to the chip for handshaking with the ICP initiator and emulating the erase/program/verify wave forms for the flash memory; the SPI bus is not always the best choice for diverse system applications; extra system logic is required to modify the original reset circuits, which are used by the in-circuit programming algorithms; and complex SPI driver and receiver logic must be attached to the chip.

Reliability can become a problem during in-circuit programming. The in-circuit programming process can take up to ten minutes, during which time there may be data transmission errors or recording errors. These errors can be especially troubling if the code which performs the communication with the outside world (handshaking code) is itself modified during the in-circuit programming process. If this code gets corrupted, the in-circuit programming module may be left without any way of resetting itself or communicating with the outside world.

What is needed is a method for providing fault-tolerance during in-circuit programming which can recover from an error during the in-circuit programming process, even if the code used by the in-circuit programming process to communicate with the outside world is improperly programmed.

Accordingly in-circuit programming structures have been developed which rely on flash memory or other dynamically alterable non-volatile memory. However, prior art approaches have been inflexible in the in-circuit algorithms used. Thus, in dynamic networking environments where communication requirements can change, and applications of devices using the in-circuit programming can proliferate through a wide variety of circumstances, it's desirable to provide more flexible in-circuit programming capability. Furthermore, the in-circuit programming capability must insure that no instructions are lost during the in-circuit programming process, even if the power is turned off during the process. The technique must allow for interactive communication with a remote partner to accomplish the in-circuit programming process. These techniques must be available over a wide variety of media, including the Intel/Microsoft/Digital standard Universal Serial Bus (USB), the Philips Electronics/Computer Access Technology standard Access Bus, the Apple Computer/IBM/AT&T standard Geoport, the Apple Computer/Texas Instruments/NCR standard 1349 FireWire, the Internet, a serial port (such as RS232), and other environments.

Thus, it is desirable to provide more flexible in-circuit programming structures for use with integrated circuits.

There is also a need for an architecture for in-circuit programming which maintains flexibility in the in-circuit programming process while minimizing the amount of silicon real estate occupied by the flash memory used to implement the in-circuit programming functions.

SUMMARY

The present invention provides a method and an apparatus for providing fault-tolerance during in-circuit programming. The invention operates by ensuring that a portion of the computer system's boot code is protected from the in-circuit programming process, so that it will not be corrupted during in-circuit programming. The invention maintains an in-circuit programming status, which is set to an incomplete value when the in-circuit programming process is in progress, and is reset to a complete value after the in-circuit programming process terminates. If the system is reset during the in-circuit programming process, the system will boot from the protected section of boot code, otherwise, the system will boot from normal boot code, which is programmable through the in-circuit programming process. The invention also operates in conjunction with a watch dog timer which causes the system to reset itself if the in-circuit programming process fails to successfully terminate.

Thus, the present invention can be characterized as a method for providing error recovery during in-circuit programming of a computer system, comprising: setting an in-circuit programming status to an incomplete value, indicating the in-system programming process is in progress; initiating the in-circuit programming process; when the in-circuit programming process terminates, setting the in-circuit programming status to a complete value indicating that the in-circuit programming process is complete; and during initialization of the system, executing a first boot code sequence if the in-circuit programming status has a complete value, the first boot code sequence being programmable through the in-circuit programming process, and executing a second boot code sequence if the in-circuit programming status has an incomplete value, the second boot code sequence being protected from the in-circuit programming process.

According to one aspect of the present invention, the in-circuit programming process includes testing a section of code programmed by the in-circuit programming process.

According to another aspect of the present invention, the in-circuit programming process is monitored in order to detect a delay in the transmission of in-circuit programming instructions. The in-circuit programming process is restarted if the delay exceeds a specific time out value. In one embodiment, the monitoring is conducted by a remote host from which the in-circuit programming code is downloaded. In another embodiment, the monitoring is performed using a watch dog timer coupled to the in-circuit programming system.

According to another aspect of the present invention, the above-mentioned method includes the step of storing an address of a remote host from which the in-circuit programming code is downloaded.

The present invention may also be characterized as an apparatus for providing error recovery during in-circuit programming of a computer system, comprising: a processor; a first boot code sequence coupled to the processor; a second boot code sequence coupled to the processor; an in-circuit programming status indicator coupled to the processor, the status indicator being set to an incomplete value during in-circuit programming, and being set to a complete value after in-circuit programming is complete; and a selector mechanism coupled to the first boot code sequence and the second boot code sequence, for selecting a boot code sequence for computer system initialization, the selector mechanism selecting the first boot code sequence if the in-circuit programming status indicator is set to a complete value, and selecting the second boot code sequence if the in-circuit programming status indicator is set to an incomplete value.

The present invention can also be characterized as a method for providing error recovery during in-circuit programming of a computer system, comprising: monitoring the in-circuit program in process in order to detect a delay in transmission of in-circuit programming instructions from a remote host; and restarting the in-circuit programming process if the delay exceeds a timeout value.

The present invention further provides an architecture for an integrated circuit supporting in-circuit programming, which allows for dynamically altering the in-circuit programming instruction set itself, as well as other software stored on the chip. This greatly expands the usability of in-circuit programming devices to a wide variety of communication environments, supporting serial ports, parallel ports, telephone communications, Internet communications, and other communication protocols as suits the needs of a particular system. The invention is based on a microcontroller or other instruction executing processor on an integrated circuit having an embedded non-volatile memory array which stores instructions, including an in-circuit programming instruction set. Using a control program stored on the device, the device interactively establishes an in-circuit programming exchange with a remote partner, and updates data and software, including the in-circuit programming sequence, when needed. For example, a self-updating algorithm, according to the present invention, proceeds as follows:

1. The device receives an in-circuit programming request.
2. The initiator is identified.
3. The device returns an identifier back to the initiator of the request.
4. The information exchange proceeds when the parties have been successfully identified.
5. In order to begin the in-circuit programming, execution of the program jumps to an in-circuit programming routine in the non-volatile memory on the chip.
6. The in-circuit programming routine mirrors itself or at least an ICP kernel, to another bank of memory on the chip.
7. The in-circuit programming software disables itself and wakes up using the mirrored ICP sequence.
8. The mirrored ICP sequence downloads new in-circuit programming software to the original ICP location.
9. The mirrored ICP sequence disables itself, and wakes up with the new ICP software in the original flash array.
10. Normal program execution is then resumed.

New instructions and data for other parts of software stored in the flash memory device can be executed at numerous places in the sequences, relying on the original ICP code, the mirrored ICP code, or the new ICP code after it has been activated.

Accordingly, the present invention can be characterized as an apparatus for in-circuit programming of an integrated circuit having a processor which executes a program of instructions. The apparatus comprises a first memory array, comprising non-volatile memory cells, on the integrated circuit which stores instructions for execution by the processor, including in-circuit programming set of instructions. A second memory array also comprising non-volatile memory cells in preferred systems, is provided on the integrated circuit. One or more external ports is provided on the integrated circuit by which data is received from an external source. Control logic, including the processor and a kernel in the ICP code, is responsive to an in-circuit programming update command to write a copy of the in-circuit programming set from the first memory array to the second memory array, and to cause the processor to execute the in-circuit programming set from the second memory array to program the non-volatile memory cells of the first memory array with data from the external port.

According to one aspect of the invention, the first memory array comprises a plurality of separately erasable blocks of non-volatile memory cells and the in-circuit programming set is stored in a particular block. During execution of the in-circuit programming set, the particular block is modified to generate a new in-circuit programming set. Then the control logic causes the processor to execute the new in-circuit programming set from the first memory array.

According to yet another aspect of the invention, the integrated circuit includes a plurality of ports to external data sources, such as one or more serial ports, one or more parallel ports, and potentially one or more specialized communication ports. The port in the plurality of ports, as used for the external port during execution of the in-circuit programming set, is determined by the instructions in the in-circuit programming set itself, and thus, can be dynamically altered in one preferred embodiment of the present invention.

According to another aspect of the invention, the integrated circuit includes a data path for programming and verifying the first memory array and optionally, the second memory array, independent of the in-circuit programming set of instructions. Thus, using multiplexed I/O pins or the like, original software can be loaded onto the device during manufacture or prior to mounting the chip into the system. In order to modify the original code, the in-circuit programming process is utilized.

The present invention can also be characterized as a controller on an integrated circuit that includes a processor on the integrated circuit which executes instructions received at an instruction input to the processor module. First and second memory arrays of non-volatile memory cells are provided on the integrated circuit. The first memory array stores the in-circuit programming set of instructions in a particular block of non-volatile cells. An external port is provided on the integrated circuit by which data is received from an external source. Control logic, including the processor and a kernel in the ICP code, is responsive to an in-circuit programming update command to write a copy of the in-circuit programming set from the first memory array to the second memory array, and to cause the in-circuit programming set from the second memory to program the non-volatile memory cells of the first memory array with data received from external port. Data paths on the integrated circuit are provided for programming and verifying the first memory array, independent of the in-circuit programming set. The external port comprises in alternative embodiments, a serial port and a parallel port. In yet another embodiment, there are a plurality of external ports on the device, and the one selected for use during the in-circuit programming sequence is specified by the in-circuit programming software itself.

Accordingly, a method for in-circuit programming of an integrated circuit having a processor which executes a program of instructions is provided. The method includes:

1. providing on the integrated circuit a first erasable and programmable read only memory array and a second erasable and programmable read only memory array;
2. storing an in-circuit programming set of instructions in the first array;
3. receiving an in-circuit program command from an initiator external to the integrated circuit;
4. in response to the in-circuit program command, copying the in-circuit programming set from the first array to the second array, and executing with the processor the in-circuit programming set from the second array;
5. programming at least a selected portion of the first array with data from an external source under control of the in-circuit programming set; and
6. after programming the portion of the first array, executing with the processor the in-circuit programming set from the first array.

According to another aspect of the present invention, the method includes storing the in-circuit programming set in the selected portion of the first memory array. Alternatively, the method can include the step of determining from the initiator whether the in-circuit programming sequence, indicated by the in-circuit programming command, includes modifying the in-circuit programming set. If the sequence does include the modification, then the step of copying and executing is carried out. If not, then the step of copying and executing is skipped, and the algorithm proceeds directly to programming the instructions and data in other portions of the memory array.

In sum, the present invention provides an in-circuit programming technique which allows for dynamic alteration of the in-circuit programming sequences of instructions. This enables the use of the device in a wide variety of environments, and in dynamically changing environments. For example, if a communication protocol is updated, then the in-circuit programming sequence of instructions itself may need modification. According to the present invention, a microcontroller can be placed in the field and dynamically updated as communication protocols are improved or speeds are increased. Furthermore, the device can be adapted for a wide variety of communications ports, allowing more widespread application of the microcontroller with in-circuit programming capability.

The present invention yet further provides an architecture for a microcontroller system on an integrated circuit supporting in-circuit programming. This system maintains flexibility in the in-circuit programming process by storing some of the in-circuit programming (ICP) code in flash memory where it can be easily altered using the in-circuit programming process, and storing portions of the ICP code that do not need to be modified in more space-efficient mask ROM cells on the integrated circuit. In particular, ICP code which handles the communication involved in the in-circuit programming process is stored in flash memory so that it may be easily modified to accommodate a number of different communication formats and protocols. Code to implement the erase, program and verify portions of the in-circuit programming process are kept in space-efficient mask ROM cells on the integrated circuit.

The flash memory array in the present invention is further simplified by implementing the state machine for the erase, program and verify functions of the flash memory in software stored in mask ROM. Timing functions for the erase, program and verify functions, which are typically implemented in hardware, are also implemented in software stored in the mask ROM. The design of the flash memory in the present invention is thereby simplified and the amount of silicon real estate occupied by the flash memory is consequently reduced. In this way, the in-circuit programming architecture according to the present invention effectively maintains flexibility in the in-circuit programming system, while reducing requirements for silicon real estate occupied by the in-circuit programming system.

Accordingly, the present invention can be characterized as an apparatus for in-circuit programming of an integrated circuit comprising a processor on the integrated circuit which executes instructions. The integrated circuit includes an external port through which data is received from an external source. The integrated circuit also includes a first memory array comprising non-volatile memory cells for storing instructions for execution by the processor, including instructions for controlling the transfer of additional instructions into the integrated circuit from the external source through the external port. The integrated circuit also contains a second memory array which stores instructions for execution by the processor, including a set of instructions for controlling the in-circuit programming steps of erasing, programming and verifying the instructions in the first memory array.

According to one aspect of the invention, the second memory array comprises a plurality of non-volatile mask ROM cells.

According to another aspect of the present invention, the sequencing of the erase, program and verify operations during the in-circuit programming process is accomplished through software which is stored in mask ROM cells in the second memory array.

According to another aspect of the present invention, the timing of the erase, program and verify operations of the in-circuit programming process is accomplished by the processor executing software stored in mask ROM cells in the second memory array.

According to yet another aspect of the present invention, the processor controls the erase, program and verify operations involved in the in-circuit programming process by writing commands to a control register, which is coupled to the first memory array.

According to another aspect of the present invention, the apparatus for in-circuit programming further includes a watch dog timer coupled to the processor, which triggers recovery from deadlock errors during the processor's execution of in-circuit programming instructions.

According to another aspect of the present invention, the external port through which data is received from an external source is configurable to operate as a parallel or a serial port.

According to another aspect of the present invention, the first memory array comprises a plurality of separately erasable blocks of non-volatile memory cells.

According to yet another aspect of the invention, the integrated circuit includes a plurality of ports to external data sources, such as one or more serial ports, one or more parallel ports, and potentially one or more specialized communication ports. The port in the plurality of ports which is used for receiving in-circuit programming instructions from an external source is determined by instructions in the in-circuit programming code itself, and thus can be dynamically altered.

According to another aspect of the invention, the integrated circuit includes a data path for programming and verifying the first memory array and optionally, the second memory array, independent of the in-circuit programming instructions. Thus, using multiplexed I/O pins or the like, original software can be loaded into the device during manufacture or prior to mounting the chip into the system.

Other aspects and advantages of the present invention can be seen upon review of the figures, the description and the claims which follow.

DESCRIPTION

The following description is presented to enable any person skilled in the art to make and use the invention, and is provided in the context of a particular application and its requirements. Various modifications to the preferred embodiments will be readily apparent to those skilled in the art, and the general principles defined herein maybe applied to other embodiments and applications without departing from the spirit and scope of the invention. Thus, the present invention is not intended to be limited to the embodiments shown but is to be accorded the widest scope consistent with the principles and features disclosed herein.

Figure 1:
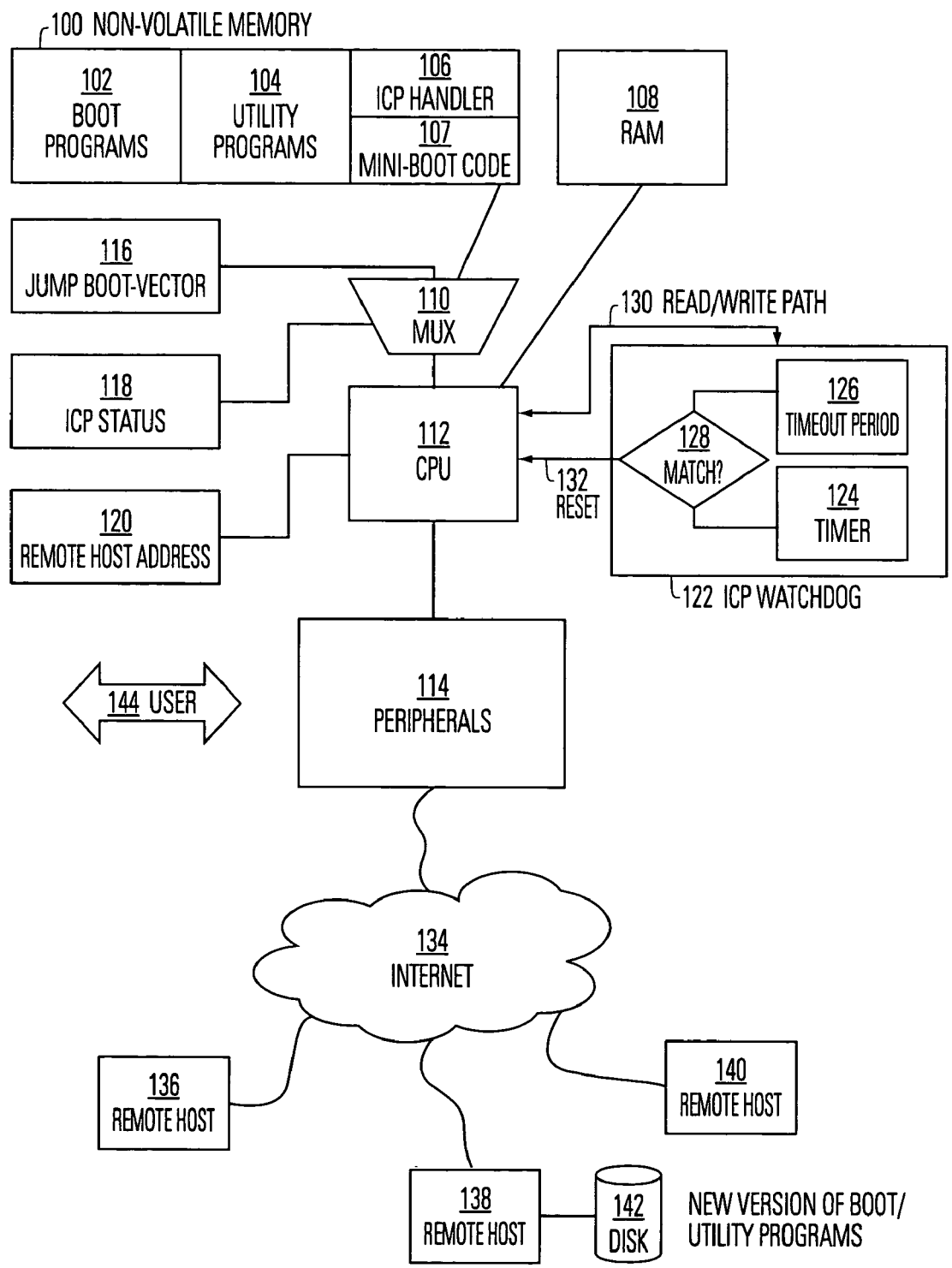
FIG. 1 is a block diagram illustrating some of the major functional components of a fault-tolerance system for in-circuit programming in accordance with an aspect of the present invention.

FIG. 1 is a block diagram illustrating some of the major functional components of a fault-tolerant system for in-circuit programming in accordance with an aspect of the present invention. The in-circuit programming system includes non-volatile memory 100, RAM 108, CPU 112 and peripherals 114. The in-circuit programming system also includes components which implement fault-tolerance, including jump boot vector 116, multiplexer (MUX) 110, ICP status register 118, remote host address register 120 and ICP watchdog 122.

More specifically, CPU 112 is any type of a processing system including a microcontroller, microprocessor or mainframe computing system. CPU 112 is coupled to RAM 108 which is a random access memory containing code and data executed by CPU 112. CPU 112 is additionally coupled to non-volatile memory 100 through MUX 110.

Non-volatile memory 100 is any type of memory that persists when power is removed from the system, including flash memory, EPROM, EEPROM, and ROM memory. Non-volatile memory 100 includes boot programs 102, utility programs 104, ICP handler 106 and mini-boot code 107. Boot programs 102 include a collection of programs which are executed during system initialization in order to initialize the hardware and software resources of the system. Boot programs 102 are stored in programmable memory, which can be modified during the in-circuit programming process. Non-volatile memory 100 also includes utility programs 104, which include programs executed by CPU 112 during operation of the system. Utility programs 104 are also contained within memory that can be programmed through the in-circuit programming process. Non-volatile memory 100 also includes ICP handler 106, which performs the in-circuit programming functions of the system, and which is also contained within memory that can be programmed through the in-circuit programming process.

Non-volatile memory 100 additionally includes mini-boot code 107, which is contained within a protected memory, which cannot be modified during the same in-circuit programming process of normal boot programs. Mini-boot code 107 is an alternative set of system initialization instructions which perform many of the same functions of boot programs 102. However, mini-boot code 107 only springs into action when there is an error during the in-circuit programming process which potentially causes boot programs 102 to be corrupted and unusable. Hence, mini-boot code 107 must be stored in memory that cannot be modified during the same in-circuit programming process of normal boot programs. In one embodiment of the present invention, mini-boot code 107 is stored in mask ROM memory while boot programs 102, utility programs 104 and ICP handler 106 are stored in programmable flash memory.

CPU 112 is additionally coupled to hardware components which facilitate fault tolerance during the in-circuit programming process. CPU 112 is coupled to MUX 110, which takes as inputs non-volatile memory 100 and jump boot vector 116, as well as a control input from ICP status register 118. MUX 110 selectively switches CPU 112 between jump boot vector 116 and non-volatile memory 100, depending upon the state of ICP status 118. If ICP status 118 is dirty, this indicates that a previous in-circuit programming operation did not complete, and CPU 112 takes as input a jump instruction to a boot vector 116 during system initialization, which points to mini-boot code 107. On the other hand, if ICP status 118 is clean, this indicates that no in-circuit programming operation is in progress, and CPU 112 takes as input the initial location of non-volatile memory 100 during system initialization. CPU 112 is additionally coupled to remote host address register 120, which contains a backup copy of the remote host address in case the system is reset during in-circuit programming. CPU 112 is also coupled to ICP watchdog 122 through read/write path 130 and reset line 132. ICP watchdog 122 contains timeout period register 126 and timer 124 as well as match logic 128. Both timer 124 and timeout period 126 can be initialized by CPU 112 through read/write path 130. When the value of timer 124 matches timeout period 126, match logic 128 causes a reset signal to be sent across reset line 123 which feeds into CPU 112. In one embodiment, the above-mentioned hardware components to provide fault-tolerance include programmable memory elements that are protected from the in-circuit programming process.

CPU 112 additionally connects to peripherals 114, which include input and output devices used to communicate with a system user, as illustrated by the double arrow on the left-hand-side of peripherals 114. Peripherals 114 also includes an interface through which peripherals 114 are coupled to Internet 134. Internet 134 is itself coupled to remote hosts 136, 138 and 140. Remote host 138 is coupled to disk 142 which contains new versions of boot and utility programs to be downloaded through Internet 134 into the in-circuit programming system.

The in-circuit programming process generally operates as follows. CPU 112 communicates with user 144 through peripherals 114. User 144 causes CPU 112 to begin executing ICP handler 106 which commences the in-circuit programming process. ICP handler 106 causes a connection to be made through peripherals 114 to Internet 134 and through Internet 134 to remote host 138. Remote host 138 then begins downloading data from disk 142 through Internet 134 to non-volatile memory 100. At the same time the data transfer is initiated, timeout period 126 within ICP watchdog 122 is set to an estimated value and timer 124 is initialized.

If the in-circuit programming process proceeds smoothly, the fault-tolerance features of the present invention are not activated. On the other hand, if there is an excessive delay in the in-circuit programming process, timer 124 will eventually match timeout period 126, causing a reset signal to flow through reset line 132 to CPU 112. This causes CPU 112 to initiate a boot sequence. If the system is rebooted during the in-circuit programming process, ICP status register 118 is set to a dirty value. This causes MUX 110 to direct jump boot vector 116 into CPU 112, which causes CPU 112 to boot from mini-boot code 107 instead of boot programs 102. If ICP status 118 is set to a clean value, this means the in-circuit programming process was complete, and MUX 110 causes CPU 112 to boot from boot programs 102.

Mini-boot code 107 causes CPU 112 to restart the in-circuit programming process by first reading a value from remote host address register 120 to determine which remote host to contact in order to reinitiate the in-circuit programming process. The in-circuit programming process then recommences.

Figure 2A:
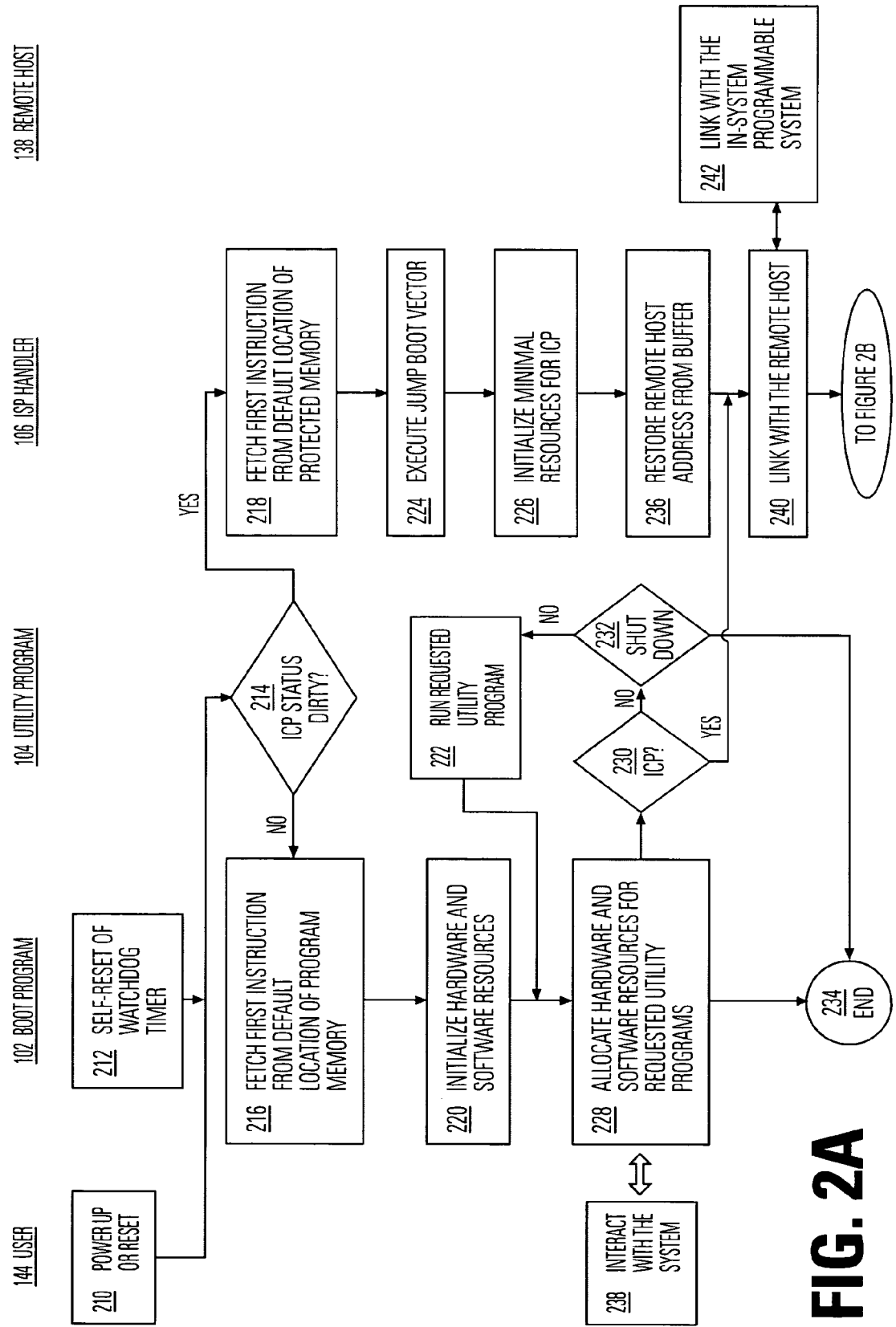
FIGS. 2A, 2B and 2C contain a flowchart illustrating the sequence of operations involved in providing fault-tolerance for an in-circuit programming system in accordance with an aspect of the present invention.
Figure 2B:
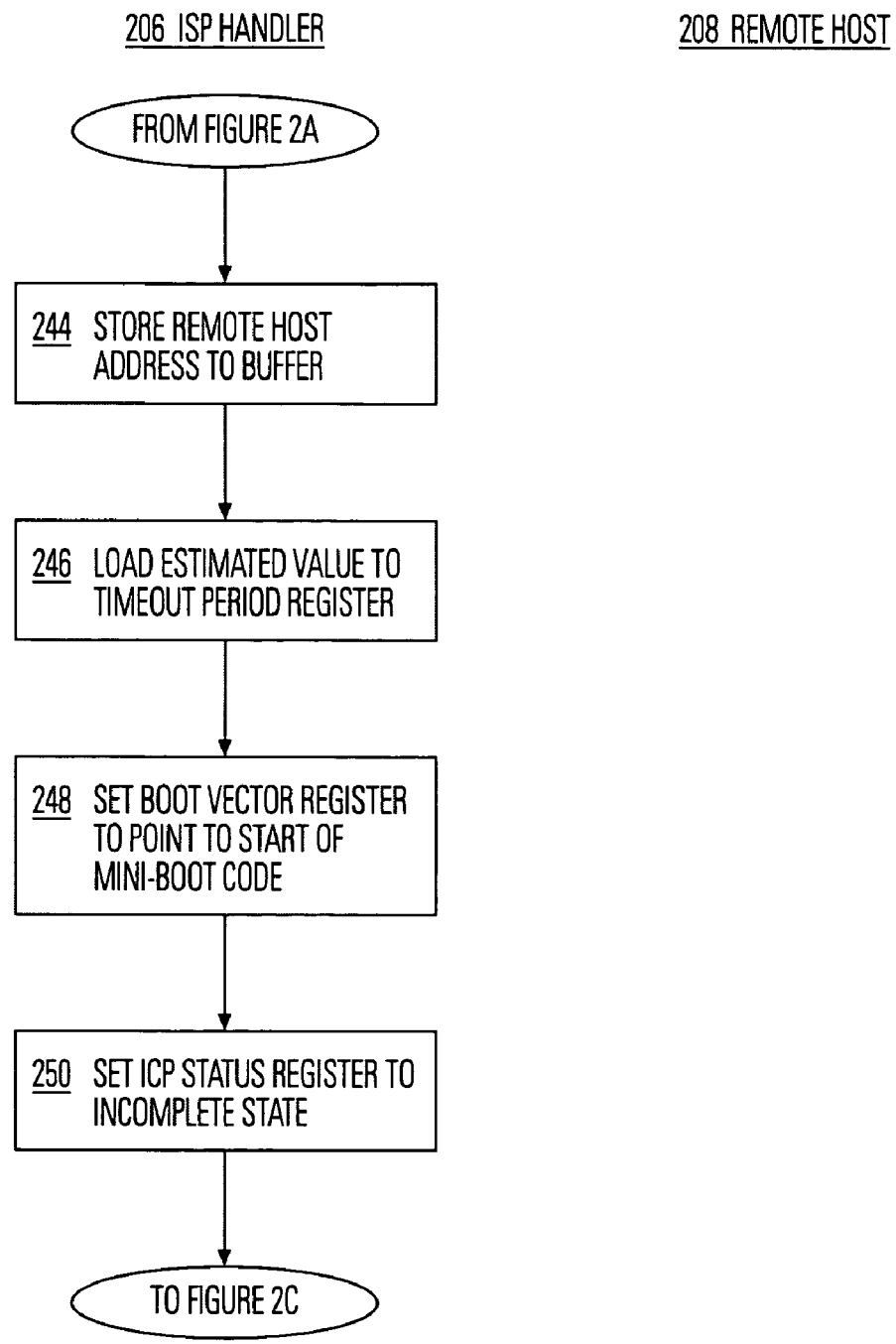
Figure 2C:
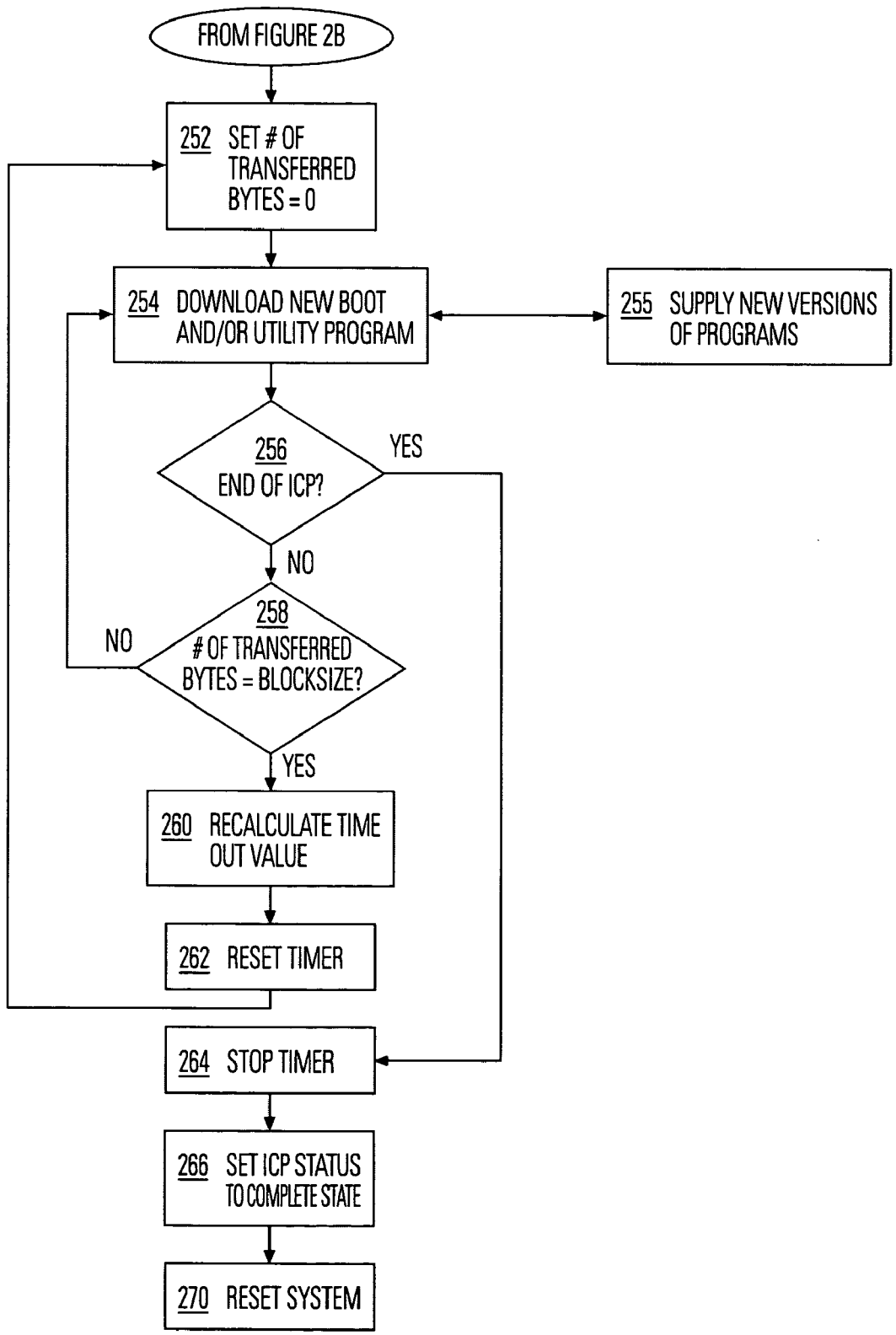

FIGS. 2A, 2B and 2C contain a flowchart illustrating in detail the sequence of operations involved in providing fault-tolerance for an in-circuit programming system in accordance with an aspect of the present invention. The flowchart contains five columns: user 144, boot program 102, utility program 104, ICP handler 106 and remote host 138. Boxes under these column headings indicate actions of user 144, boot program 102, utility program 104, ICP handler 106 and remote host 138, respectively.

The system starts at step 210, in which the system is powered up or reset by the user, or the system starts at step 212, in which the system is self reset by the watchdog timer. The system next proceeds to step 214 in which the system determines whether the ICP status is set to a dirty value. If so, the system proceeds to step 218. If not, the system proceeds to step 216.

At step 216, the ICP status is clean. Hence, the system fetches a first instruction from the default location of the program memory. The system then proceeds to step 220. At step 220, the system initializes hardware and software resources of the system by executing boot programs 102. The system next proceeds to step 228. At step 228, the system allocates the requisite hardware and software resources for requested utility programs. The system next proceeds to step 230. At step 230, the system determines whether in-circuit programming should occur. If not, the system proceeds to step 232. If so, the system proceeds to step 240. At step 232, no in-circuit programming is presently required, and the system determines whether or not to shut down. If so, the system proceeds to step 234 which is an end state. If not, the system proceeds to step 222. At step 222, the system runs the requested utility programs. The system then returns to step 228 to allocate hardware and software resources for the requested utility program. Note, that in step 228 the system may interact with user 144 to determine the proper hardware and software resources to allocate.

At step 218, the ICP status was determined to be dirty upon system boot up. Because it is possible that the regular system boot up code is corrupted, the system fetches the first instruction from a default location in a protected memory that cannot be modified by the in-circuit programming process. The system next proceeds to step 224. At step 224, the system executes a jump instruction to the boot vector which points to the specific entry within the protected memory. The system next proceeds to step 226. At step 226, the system executes mini-boot code 107, which initializes minimal system resources for in-circuit programming. The system next proceeds to step 236. At step 236, the system restores the remote host address from remote host address register 120. The system next proceeds to step 240.

At step 240, the system initiates a link with a remote host from which the in-circuit programming code is downloaded. Correspondingly, at step 242, the remote host 138 links with the in-circuit programming system. The system next proceeds to step 244. At step 244, the system stores the remote host address to remote host address buffer 120. The system next proceeds to step 246. At step 246, the system loads and estimated timeout value to the timeout period register 126. The system next proceeds step 248. At step 248, the system sets the boot vector register 116 to point to the start address of mini-boot code 107. The system next proceeds to step 250. At step 250, the system sets the ICP status register to an incomplete state indicating that in-circuit programming is currently active. The system next proceeds to step 252. At step 252, the system sets the number of transferred bytes to zero. The system next proceeds to step 254. At step 254, the system proceeds to download a new boot and/or utility program into non-volatile memory 100. Correspondingly, remote host 138 supplies new versions of the boot and/or utility programs at step 255. The system then proceeds to step 256. At step 256, the system determines whether the ICP process is finished. If not, the system proceeds to step 258. If so, the system proceeds to step 264. At step 258, the ICP process has not terminated and the system asks whether the number of transferred bytes equals a transfer block size. If not, the system returns to step 254 in order to download more code. If so, the system proceeds to step 260. At step 260, the system recalculates the timeout value based upon performance during transfer of the preceding block in-circuit programming code. The system then proceeds to step 262 wherein timer 124 is reset. The system next returns to step 252, in which the number of transferred bytes is reset to zero.

At step 264, the data transfer for in-circuit programming is complete, and timer 124 is stopped. The system next proceeds to step 266. At step 266, the system sets the ICP status to a complete value, indicating that in-circuit programming is complete. The system then proceeds to step 270. At step 270, the in-circuit programming process is complete and the system is reset.

According to one aspect of the present invention, the in-circuit programming process is governed by a time out period. During this time out period a certain amount of data must be transferred from a remote host to the in-circuit programming system. In one embodiment, this timeout period is downloaded to the processor from the remote host twice, and the two downloaded values are compared against each other to ensure that the value is properly downloaded before the value is used as the time out period. In another embodiment, a timeout period is permanently stored in the in-circuit programming system, and a downloaded time out value is compared with the permanently stored value to ensure the downloaded value is at least as large as the permanently stored value. If it is not, the permanently stored value is used.

FIGS. 3, 4A-4C, 5 and 6 are taken from one of the applications that became patents, which were incorporated by reference and are now bodily incorporated.

Figure 3:
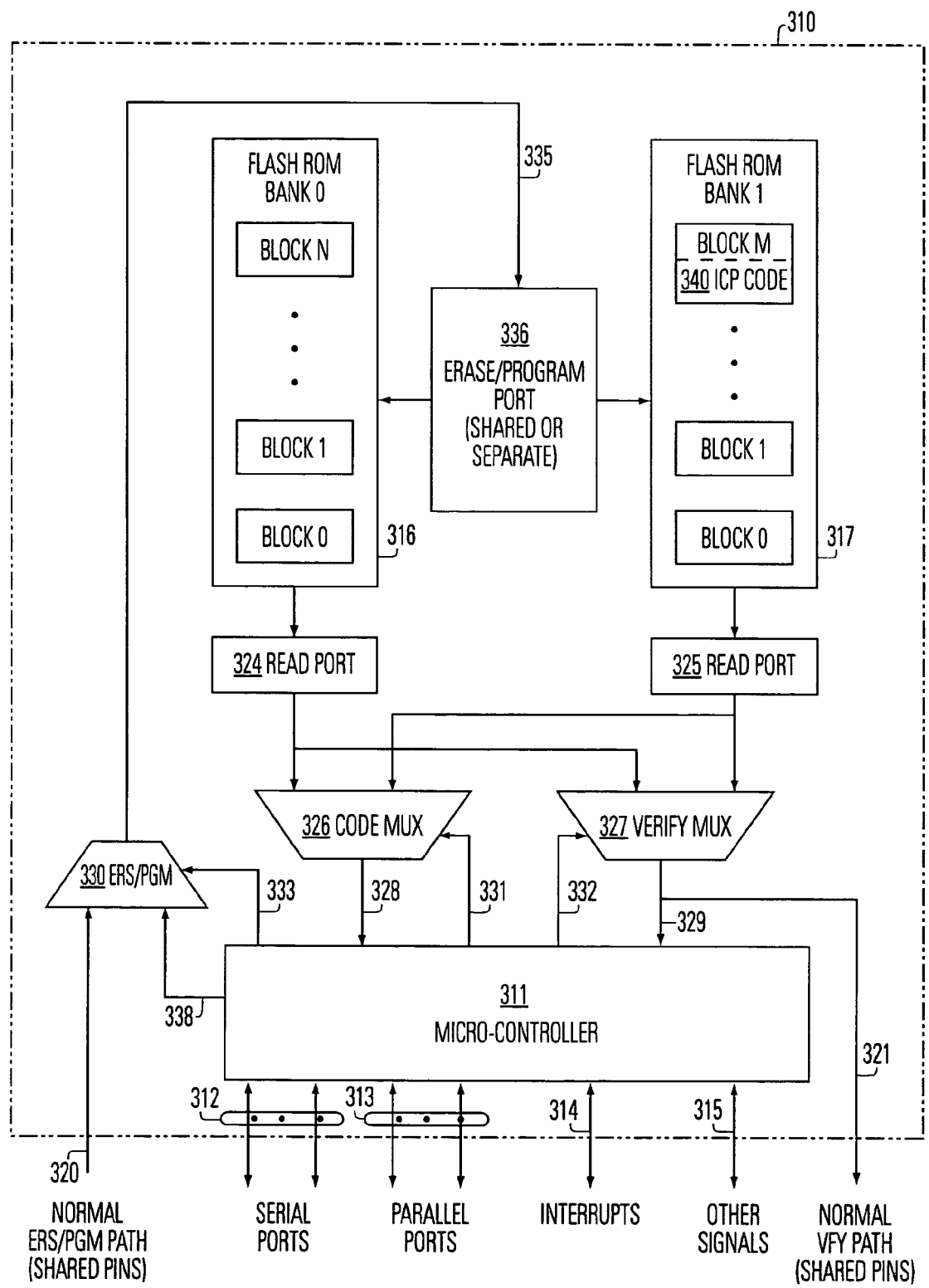
FIG. 3 is a schematic block diagram of an integrated circuit microcontroller, including the in-circuit programming structures of the present invention.

FIG. 3 is a simplified diagram of an integrated circuit 310 having a processor, such as a microcontroller 311, embedded on the integrated circuit 310. Microcontroller 311 includes a plurality of serial ports 312, a plurality of parallel ports 313, interrupt pins 314, and other signal pins 315. For example, microcontroller 311 may be compatible with the standard 8051 microcontroller instruction set known in the art. A plurality of ports 312 and 313 are implemented on the device using standard interface technology. Alternative designs include special purpose ports on chip.

To support the in-circuit programming functionality of the present invention, a first array 316 of non-volatile memory and a second array 317 of non-volatile memory are embedded on integrated circuit 310. According to a preferred embodiment, first array 316 comprises flash ROM cells, which are implemented using floating gate memory cells, as known in the art. The first array includes a plurality of blocks of flash ROM cells, block 0 through block N, and is referred to as bank 0. Second array 317 also comprises flash ROM, and includes a plurality of blocks of cells, block 0 through block M and is referred to as bank 1.

The integrated circuit includes a normal path 320 for erase and programming of arrays 316 and 317 and a normal verify path 321 for verifying the erase and programming processes, as known in the art. In a preferred system, normal paths 320 and 321 are coupled to external circuits by I/O pins on integrated circuit 310. Furthermore, these I/O pins on integrated circuit 310 are multiplexed with other pins supporting ports 312, 313, interrupts 314, and other signals 315. Thus, for example, during a test mode or manufacturing mode, the normal erase and program path 320 and the normal verify path 321 are enabled, while other functions of the I/O chips are disabled. Techniques for accomplishing the multiplexed I/O pins are common in the art.

First array 316 and second array 317 include respective read ports 324 and 325, for providing instructions stored in the arrays to microcontroller 311. Thus, read port 324 is coupled to a code input multiplexer 326, and read port 325 is coupled to the code input multiplexer 326. In a similar fashion, both read ports 324 and 325 are coupled to a verify multiplexer 327 by which data in array 316 and array 317 is read during a verify procedure.

The output of the code multiplexer 326 is supplied to an instruction input 328 for microcontroller 311. The output of the verify multiplexer 327 is supplied to a read input 329 of microcontroller 311 and to normal verify path 321.

Normal erase/program path 320 is connected to an erase/program selector 330. A second input to selector 330 includes erase and program signals on line 338 from microcontroller 311. Microcontroller 311 controls multiplexer 326 and multiplexer 327 as indicated by lines 331 and 332. Also, microcontroller 311 controls selector 330, as indicated by line 333.

Erase/program selector 330 supplies the erase and program data and signals on line 335 to erase/program port 336 for first array 316 and second array 317. The erase/program port 336 includes logic and circuits used in the erase and program operation for the arrays, such as a control state machine, a high voltage generator, a negative voltage generator, timers and the like. In the preferred embodiment, a shared erase/program circuits are used for both first array 316 and second array 317. In an alternative, separate erase/program circuits are used for the separate non-volatile memory cells. The use of separate erase/program circuits may be preferred to simplify implementation of the device, at the cost of consuming chip area.

In the embodiment illustrated in FIG. 3, only two banks of flash ROM cells are illustrated. Alternative systems include more than two banks of flash ROM cells, allowing even greater flexibility in the design and implementation of in-circuit programming structures.

As illustrated in FIG. 3, memory arrays 316 and 317 store instructions which are executed by microcontroller 311. One portion of the instructions comprises an ICP kernel, referred to as an in-circuit programming set of instructions 340. The ICP kernel includes essential ICP code and/or system code that must be preserved during in-circuit programming processes. In the embodiment shown in FIG. 3, the in-circuit programming set is stored in block M of bank 1 of flash ROM array 317. In-circuit programming set 340 can be stored at any particular block in the device in any given implementation. Also, arrays 316 and 317 include a plurality of blocks of cells which are separately erasable, according to a segmented flash architecture, for example, such as that described in U.S. Pat. No. 5,526,307, entitled FLASH EPROM INTEGRATED CIRCUIT ARCHITECTURE, invented by Yin, et al. Alternative embodiments include a plurality of separately erasable blocks in first array 316, and a single block in second array 317. Alternatively, a single block may be stored in each array. A wide variety of combinations of memory architectures can be implemented as suits the needs of a particular system.

Using the architecture of FIG. 3, designers of systems are enabled to adapt the in-circuit programming code to their particular environment. Thus, a manufacturer selects an integrated circuit, shown in FIG. 3, for implementation in their circuit. If the in-circuit programming code is not ready, the microcontroller is utilized and the variety of communication ports available on the chip are taken advantage of to minimize the extra logic needed on the circuit board with the microcontroller, to match the system to the particular in-circuit programming (ICP) environment envisioned. The proper connection and protocol for in-circuit programming is selected by the designer. The ICP code for the selected environment is developed and improved. Next, the ICP code is integrated with programs to be executed during normal operation of the system. Using normal erase and program path 320, the integrated ICP code and user code are stored in the flash memory arrays 316 and 317. Next, using normal verify path 321, the erase and program operations are verified. The smart microcontroller, having the integrated ICP code is then placed inside the system. The ICP procedure is executed and tested. If the ICP code works well, then the system is tested. If the system works well, then the system products can be mass produced. If the ICP code needs modification, then the process can be iteratively executed to optimize the ICP code. Similarly, the system code is optimized using the same techniques. The end user of the system developed by the manufacturer thus, has a robust in-circuit programming code embedded in the microcontroller, which can be updated and modified on the fly using the interactive in-circuit programming techniques, according to the present invention.

Figure 4A:
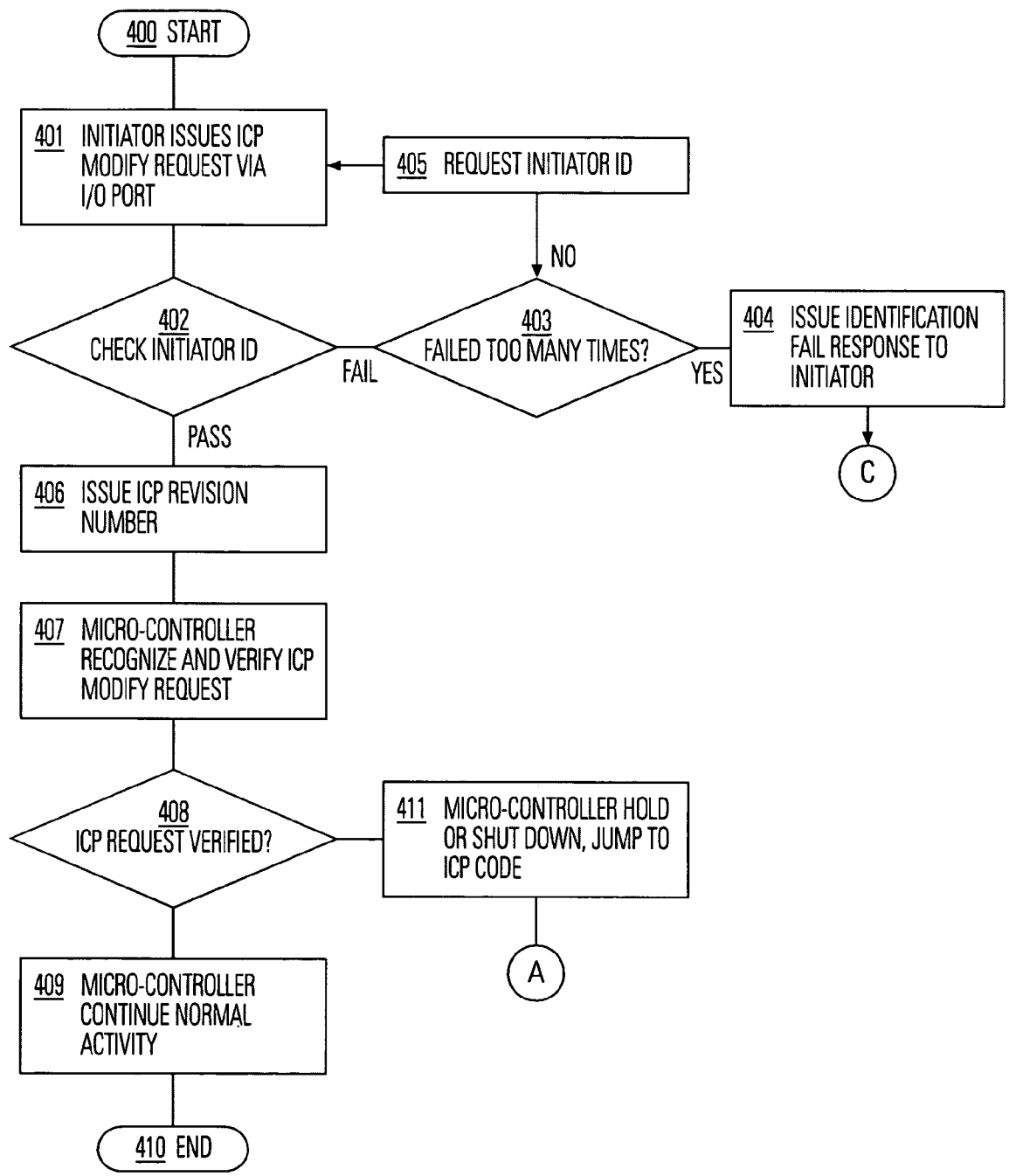
FIGS. 4A-4C are a flow chart of a preferred in-circuit programming process according to the present invention.
Figure 4B:
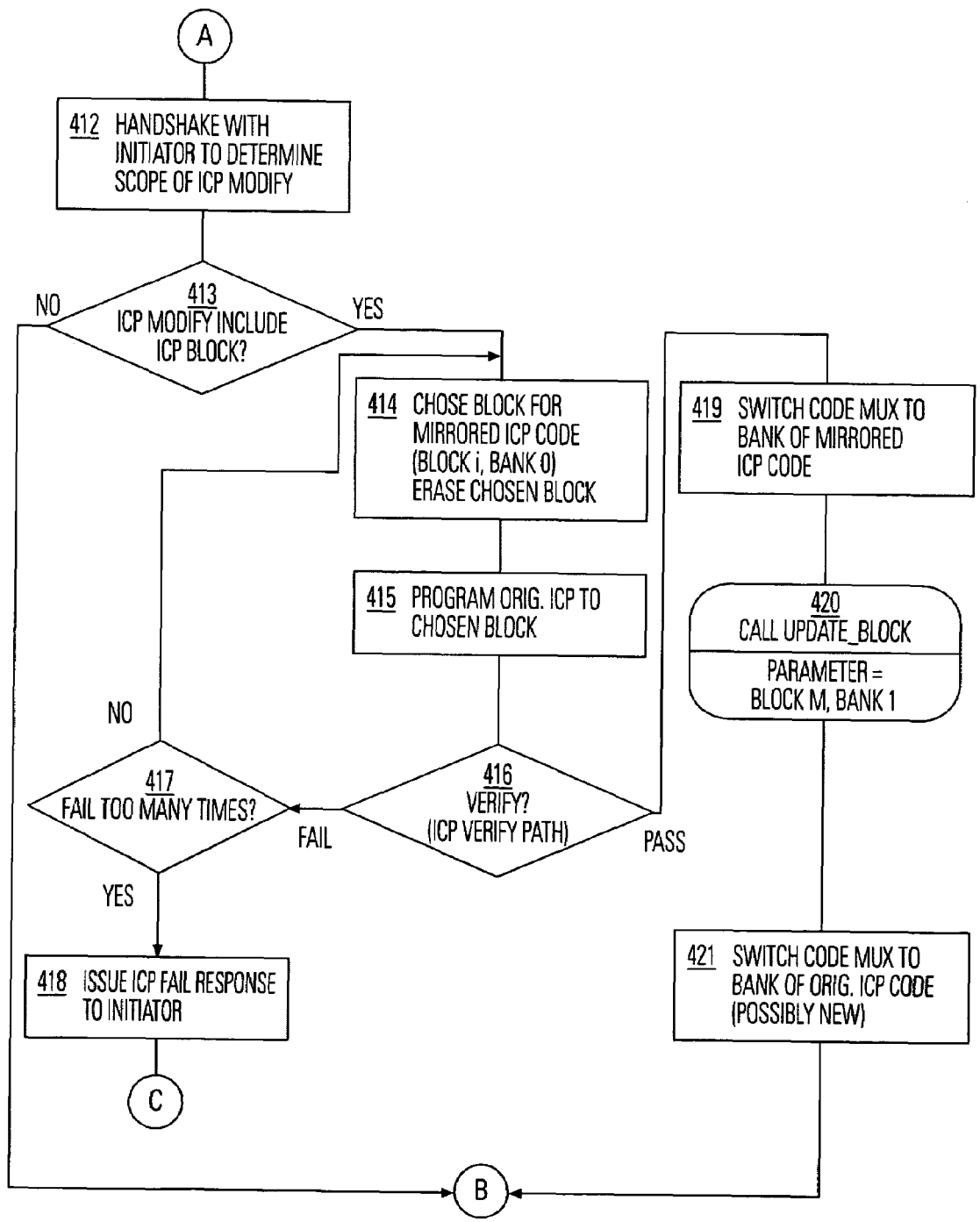
Figure 4C:
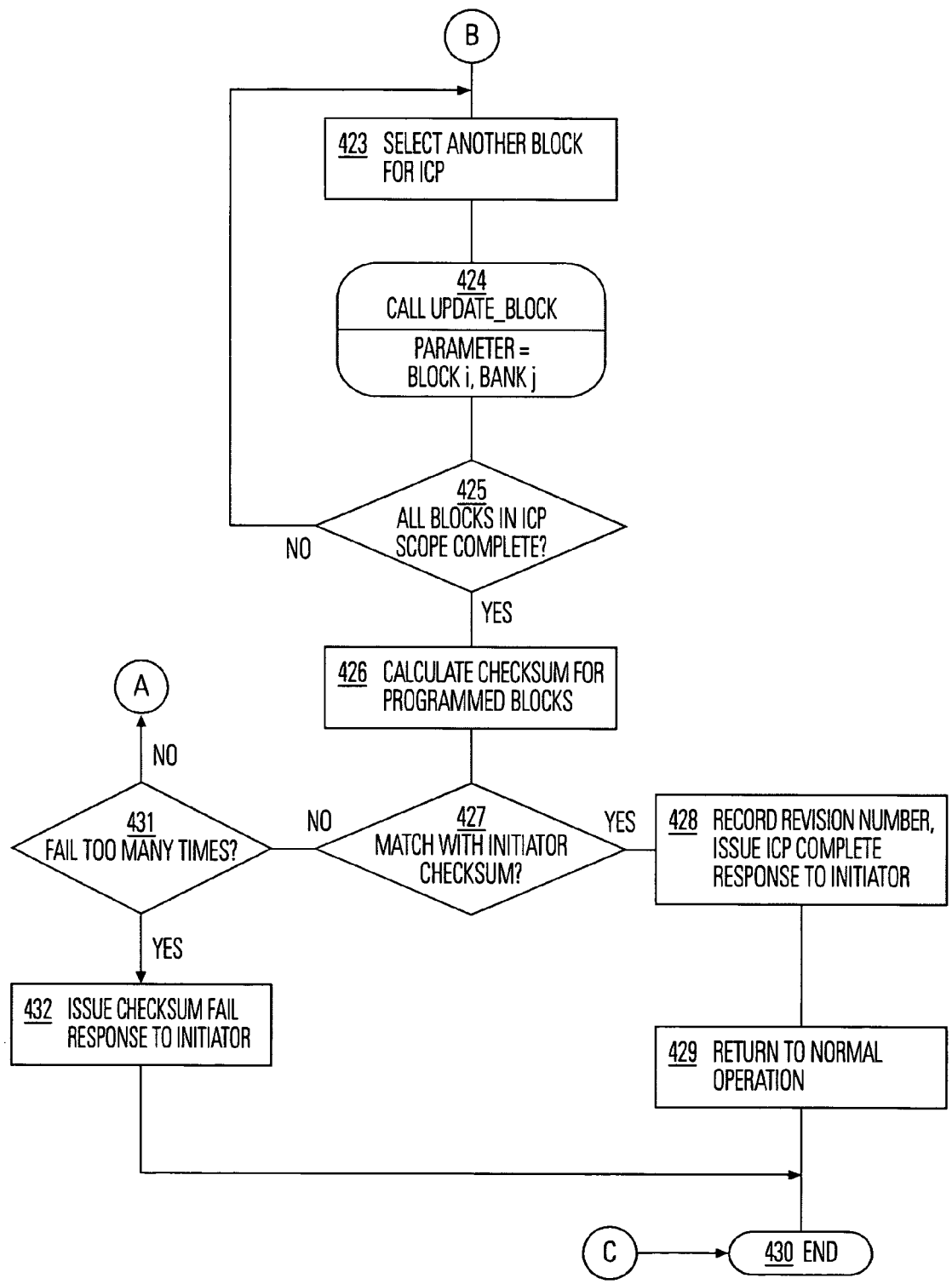

FIGS. 4A-4C illustrate the in-circuit programming techniques executed by end users, according to the present, invention. The logic, according to FIGS. 4A-4C, is implemented by software executed by the microcontroller, by dedicated logic circuits, or by a combination of software and dedicated logic circuits.

The process begins in FIG. 4A when a remote initiator desires to update or replace the in-circuit programming set of instructions or other software stored in one of the flash ROM banks of the integrated circuit, as indicated at point 400. A first step involves the initiator sending an ICP modify request via an I/O port on the integrated circuit (block 401). The microcontroller checks the identifier of the initiator, which is carried with the request. (block 402). If the identifier check fails, the algorithm determines whether a threshold number of failures has occurred (block 403). If the test has failed too many times, then the microcontroller issues an identification fail response to the initiator (block 404), and branches to point C in FIG. 4C. If the test of block 402 has not failed too many times, then the microcontroller issues an initiator identifier request to the initiator (block 405), and branches to block 401. If the initiator identifier test of block 402 passes, the initiator or the microcontroller issues a revision number to identify the update (block 406). Next, the microcontroller recognizes and verifies the ICP modify request in the next step (block 407). For example, in one embodiment, the microcontroller issues an ICP identification command back to the, ICP initiator. The initiator responds with an acknowledgment to open an ICP communication channel.

In the next step, the microcontroller determines whether the ICP modify request has been verified (block 408). If the request is not verified, then the microcontroller continues with normal activity (block 409) and the sequence ends (block 410). If the ICP modify request is verified, then the microcontroller executes a trap to the ICP code (block 411). Thus, the microcontroller holds its current status, shuts down normal activities, and jumps to the ICP code, to begin getting ready for an in-circuit programming sequence. The process continues to point A in FIG. 4B.

The first step in FIG. 4B involves a handshake protocol with the initiator to determine the scope of the ICP modify sequence (block 412). For example, the ICP modify sequence may involve one block or many blocks in the first and second arrays in the integrated circuit. Also, the handshake protocol determines whether the ICP code itself is subject of the modify operation. Thus, the next step determines whether the ICP block is included in the modify sequence (block 413). If the ICP block is not included in the modify sequence, then the algorithm proceeds to point B as indicated, which picks up in FIG. 4C. If the ICP modify sequence does include the ICP block, then the ICP logic chooses a block for storing mirrored ICP code (block i bank 0 in the embodiment where the ICP code is originally stored in bank 1). Upon choosing the block in which to mirror the ICP code, the chosen block is erased (block 414). Next, the original ICP code is programmed into the chosen block in bank 0 (block 415).

After the program sequence, a verify operation is executed (block 416). If the verify sequence fails, then the algorithm determines whether the program of the ICP block has failed too many times (block 417). If not, then the program of the ICP block is retried by looping to block 414. If the sequence has failed too many times, then the logic issues an ICP fail response to the initiator (block 418), and branches to point C in FIG. 4C.

If at block 416, the verify procedure passes, then the code multiplexer (e.g., multiplexer 326 of FIG. 3) is switched to select instructions from the bank in which the mirrored ICP code is stored (block 419). Mirrored ICP code is executed, and a call to the update block routine with the parameters set for block M of bank 1, is made (block 420). The update block routine is illustrated in FIG. 3, and results in updating block M of bank 1, with possibly new ICP code. After step 415, the code multiplexer is switched back to the original bank, bank 1, storing the possibly new ICP code (block 421). The algorithm then proceeds to point B of FIG. 4C.

In FIG. 4C, the next step involves selecting another block for the ICP procedure, if any (block 423). After selecting another block, the update block is called with a parameter set at block i, bank j, indicating the selected block (block 424). The algorithm next determines whether all blocks in the in-circuit programming sequence are completed (block 425). If yes, then a checksum is calculated for all programmed blocks (block 426). If no at block 425, then the algorithm loops to block 423. The loop continues until all blocks in the determined scope of the in-circuit programming procedure have been completed. After completion of the ICP procedure, a checksum is calculated for all programmed blocks (block 426). A protocol is initiated to match the calculated checksum with the checksum provided by the initiator (block 427). If a match occurs, then the microcontroller records the revision number, and issues an ICP complete response to the initiator (block 428). Then the microcontroller returns to normal operation (block 429), and the algorithm ends (block 430). If the checksum does not match at block 427, then the algorithm determines whether the ICP sequence has failed too many times (block 431). If it has not failed too many times, then the algorithm loops to point A of FIG. 4A, to retry the ICP sequence. If the ICP sequence has failed too many times, then the algorithm issues an ICP fail response to the initiator (block 432) and the procedure ends (block 430).

Figure 5:
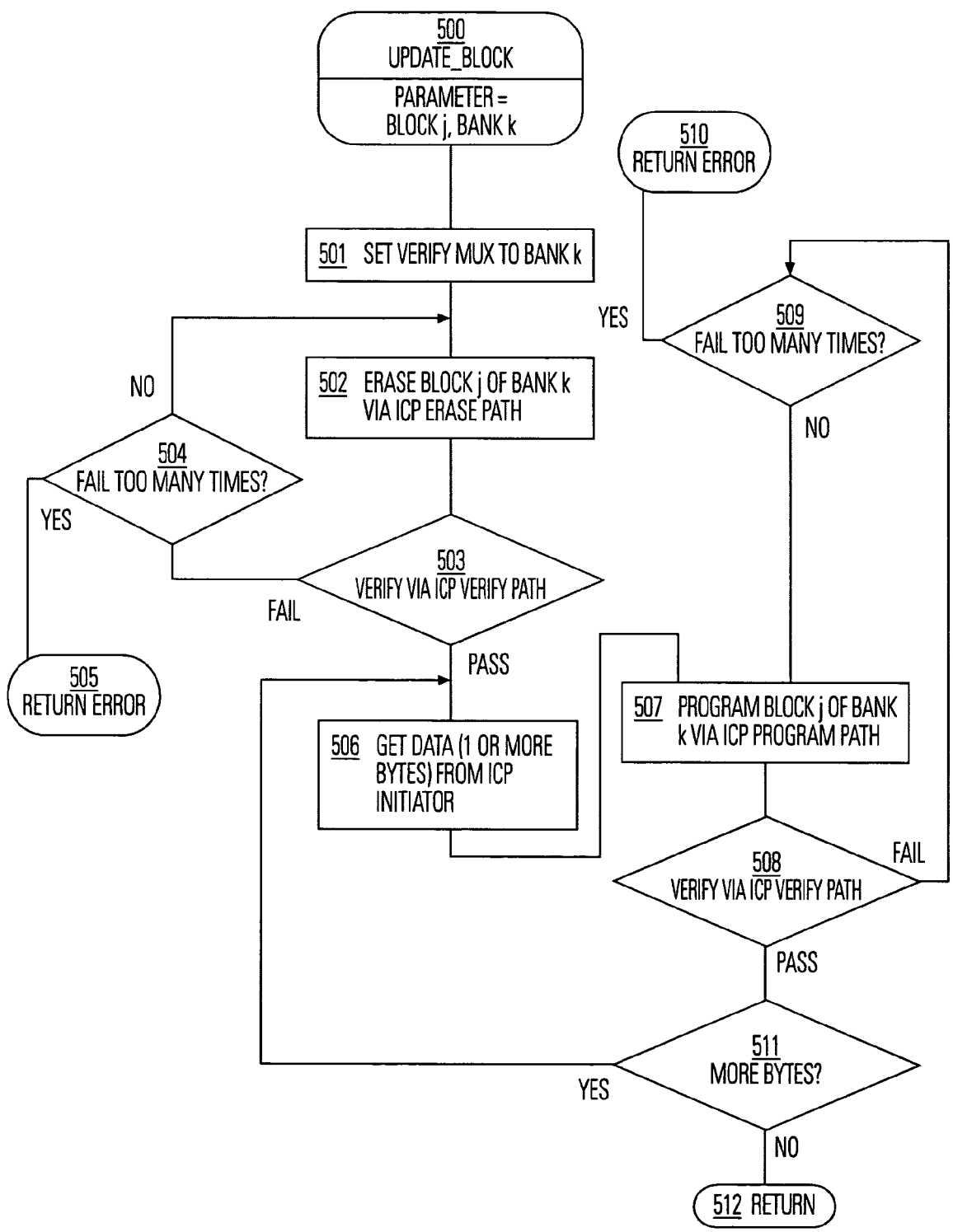
FIG. 5 is a flow chart of the update block routine which is called for in the process of FIGS. 4A-4C.

The update block procedure is illustrated in FIG. 5. Thus, the update block procedure is called with a parameter set, for instance block j, bank k (block 500). The sequence sets the verify multiplexer to select bank k for the verify path (block 501). Next block j of bank k is erased using the ICP erase path (block 502). After the erase process, a verify sequence is executed (block 503). If the verify fails, then it is determined whether the erase procedure has failed too many times (block 504). If not, then the algorithm loops back to block 502 to retry the erase. If it has failed too many times, then an error is returned (block 505). After successful verify from block 503, data is retrieved from the ICP initiator (block 506). The data from the ICP initiator may be one or more bytes of data depending on the ICP protocol selected by the user.

After retrieving the data from the ICP initiator, the algorithm programs block j of bank k via the ICP program path (block 507). After the program sequence, a verify operation is executed (block 508). If the program verify fails, then it is determined whether the fail has occurred too many times (block 509). If it has failed too many times, then an error is returned (block 510). If the verify has not failed too many times, then the program is retried by looping to block 507. If at block 508 the verify succeeds, then it is determined whether the ICP sequence includes more data for programming into block j of bank k (block 511). If yes, then the algorithm loops to block 506 to retrieve the next sequence of data for programming. If no more bytes remain, then the algorithm returns (block 512).

Figure 6:
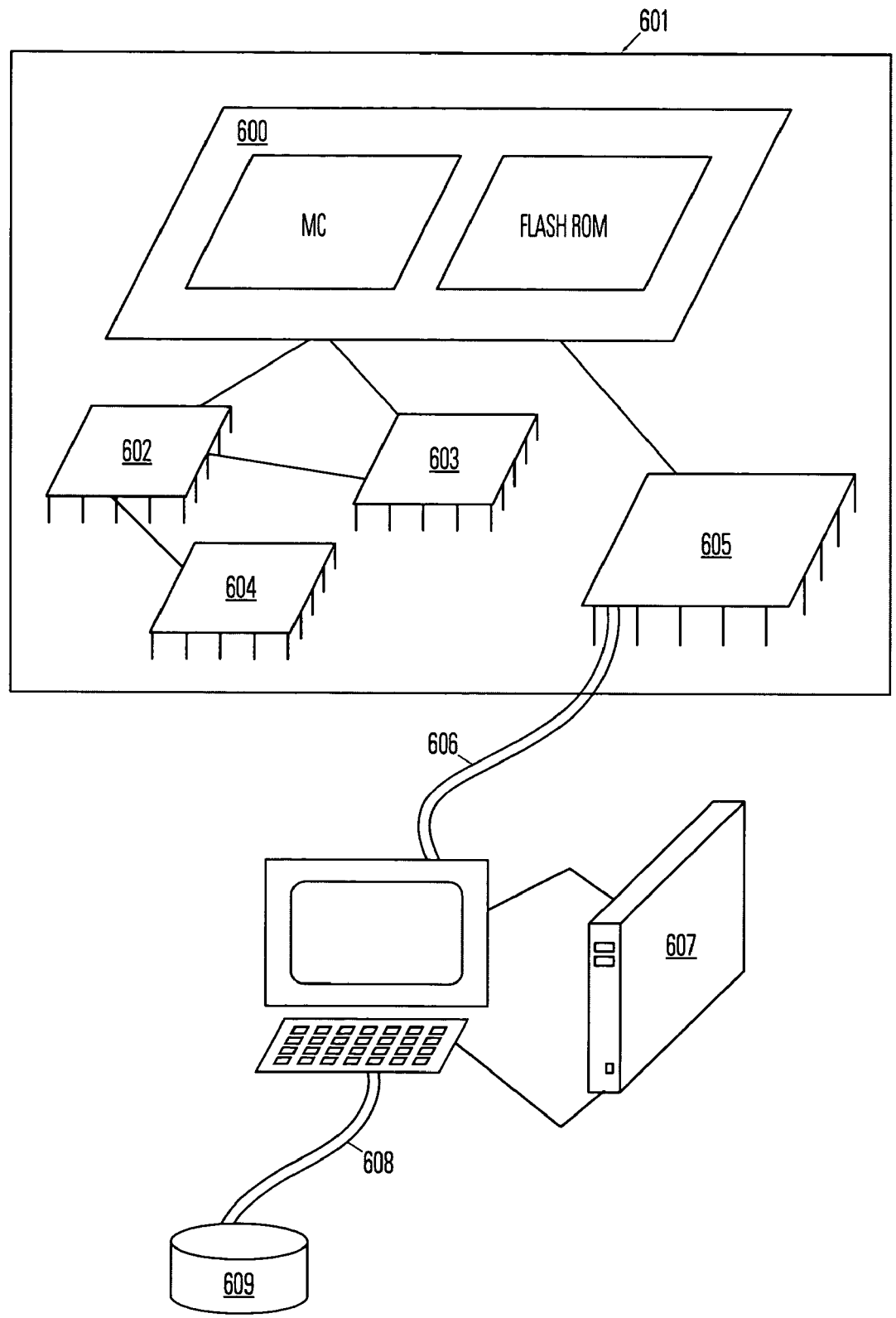
FIG. 6 illustrates an environment of application of the present invention.

FIG. 6 illustrates the environment of application of the present invention. The present invention is implemented on an integrated circuit 600 which is placed on a printed circuit board 601 or other system implementation. The microcontroller 600 is coupled to a plurality of integrated circuits 602, 603, 604, and/or 605, in the system in which it is utilized. Chip 605 provides a bridge to a communication channel across which ICP programming is achieved. Chip 605 may comprise a simple network port, or may include extra glue logic, to make the ICP solution transparent to existing system behavior. The character of port chip 605 will be different in different applications. Chip 605 may be coupled to diverse ICP communication channels having different levels of data rates, error rates, and complexity. For example, the communication channel 606, in one embodiment, comprises an Internet protocol. Channel 606 is coupled to an ICP initiator 607, such as a personal computer or workstation. Workstation 607 is coupled by a network or other communication channel 608 to a large scale storage 609. For example, workstation 607 may be a World Wide Web site accessed through the Internet on channel 606. Alternatively, in other systems, workstation 607 acts as the initiator across a dial-up modem link. In another alternative, communication link 606 is a communication bus in a personal computer, and the in-circuit software is loaded across the bus 606, so that the upgrades to system 601 can be distributed to end users on floppy disks or otherwise in loaded through personal computer 607.

Accordingly, the present invention provides a smart and flexible flash memory-based microcontroller architecture which allows for diverse in-circuit programming applications. For example, televisions or video monitors, digital video disks or CD-ROMs, remote control devices, or mobile telephones may include microcontrollers with in-circuit programming structures, according to the present invention. Various sources of updated ICP code can then be loaded into the respective devices using the flexible architecture of the present invention. The single in-circuit programming architecture of the present invention can be utilized in a wide variety of applications. Very little or no glue logic is needed in order to support the in-circuit programming structures. Furthermore, the power of the microcontroller associated with the in-circuit programming can be leveraged to increase the flexibility and to customized to ICP protocol for a given environment.

Figure 7:
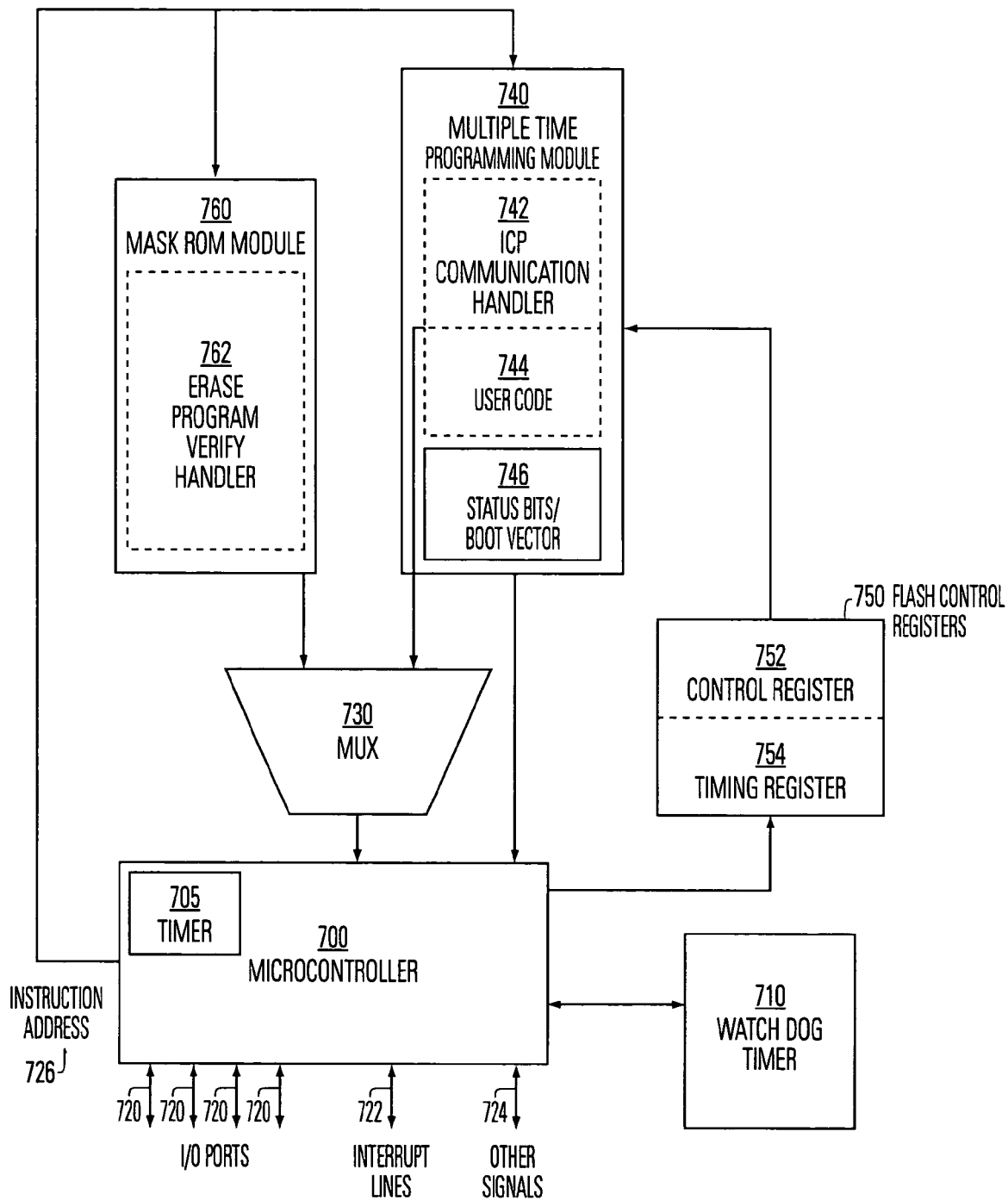
FIG. 7 is a block diagram of a system for in-circuit programming of an integrated circuit in accordance with an aspect of the present invention.

FIG. 7 is a block diagram of a system for in-circuit programming in accordance with an aspect of the present invention. All of the components illustrated in FIG. 7 reside on an integrated circuit. Microcontroller 700 executes instructions from mask ROM module 760 and multiple time programming module 740. Multiple time programming module 740 is a simplified flash memory array which is divided into a plurality of independently erasable blocks of flash memory cells. Multiple time programming module 740 also contains status bits and boot vector 746 which directly connect to microcontroller 700. Multiple time programming module 740 also contains code to implement ICP communication handler 742 as well as user code 744 to implement user-defined functions for microcontroller 700. Microcontroller 700 includes connections to devices external to the integrated circuit through I/O ports 720, interrupt lines 722 and other signals 724. Interrupt lines 722 and other signals 724 are generally used to coordinate and synchronize communications through 710 ports 720. Microcontroller 700 additionally includes timer 705, which implements timing functions for microcontroller 700. Watch dog timer 710 is coupled to microcontroller 700 and is used to detect deadlocks in the operation of microcontroller 700.

Microcontroller 700 issues an instruction address 726 which feeds into address inputs of both mask ROM module 760 and multiple time programming module 740. Instruction address 726 indexes instructions within mask ROM module 760 and multiple time programming module 740. Instructions from mask ROM module 760 and multiple time programming module 740 feed through multiplexer (MUX) 730 which selectively switches these instructions into microcontroller 700. Additionally, status bits and boot vector 746, which are part of multiple time programming module 740, feed into microcontroller 700.

In a preferred embodiment of the present invention, the boot vector is not part of the flash memory array within multiple time programming module 740. It is, instead, a separate register within multiple time programming module 740, which is selectively outputted from multiple time programming module 740 when a particular address and particular control signals are inputted in multiple time programming module 740.

Microcontroller 700 controls the operation of multiple time programming module 740 through flash control registers 750. Flash control registers 750, include control register 752 and timing register 754. Microcontroller 700 write control codes to flash control registers 750 to control the erase, program and verify functions of the in-circuit programming process for code within multiple time programming module 740. Control codes for a preferred embodiment of the present invention are illustrated in Tables 1 and 2.

Table 1 contains a listing of the bit patterns which feed into control register 752 to control erase, program and verify functions for multiple time programming module 740.

TABLE 1

© 1996 Macronix International, Col., Ltd.
FMCON: Flash Module Control register
    FMCON[7:4]: Reserved
    FMCON[3:0]:i.e. MS[3:0] of MTPG2 module
        0000: normal read MTP module at DPTR/PA[15:0] location;
              this is the default value after reset
        0001: erase 0–64KB as well as LOCK bits
        0010: block erase;
              erase 0–16K if DPTR [2:0] = 000
              erase 16–32K if DPTR [2:] = 010
              erase 32–48K if DPTR [2:] = 100
              erase 48–56K if DPTR [2:] = 110
              erase 56–64K if DPTR [2:] = 111
        0011: program byte at DPTR/PA [15:0] with data =
              FMDATA/DQ[7:0]
        0100: verify erased byte at DPTR/PA [15:0]
        0101: verify programmed byte at DPTR/PA [15:0]
        0110: program lock bits,
              program LOCK[1] to be 1 if DPTR [1:0] =00
              program LOCK[2] to be 1 if DPTR [1:0] =01
              program LOCK[3] to be 1 if DPTR [1:0] =1x
        0111: verify three programmed lock bits
        1001: erase status bits as well as boot vector
        1010: program status bits or boot vector
              program SBIT[1:0] if DPTR[0] =
              0 with FMDATA/DQ[1:0]
              program BVEC[7:0] if DPTR[0] =
              1 with FMDATA/DQ[7:0]
        1011: verify programmed status bits or boot vector,
              verify SBIT[1:0] if DPTR[0] = 0
              verify BVEC[7:0] if DPTR[0] = 1
        1111: read Manufacture ID or DeviceID Table 2 contains a listing of the functions implemented by various bits within timing register 754. By manipulating these bits, microcontroller 700 produces the wave forms required for flash memory erase, program, verify and read operations.

TABLE 2

FMTIM:    Flash Module Timing register, used by software to emulate
           the waveform needed for flash operations.
        FMTIM[7]: VPP Enable bit.
        FMTIM[6]: Module Enable bit
        FMTIM[5]: Read Enable bit TABLE 2-continued FMTIM[4]: Write Enable bit
FMTIM[3:0]: Reserved Mask ROM module 760 contains code to implement erase, program and verify handler 762. This includes code to perform the sequencing and timing of the erasing, programming and verifying operations involved in in-circuit programming. A listing of this type of code for a preferred embodiment of the present invention appears in Table 3 which is attached hereto as Appendix A. Table 3 is an 8051 assembly code listing of subroutines involved in the erasing, programming and verifying functions of the in-circuit programming system.

The key insight behind the present invention is that the in-circuit programming code can be divided into two pieces. Portions of the code which are commonly modified, such as the in circuit programming communication handler, which must be reconfigured for each different communication protocol, are stored in flash memory within multiple time programming module 740. Portions of the ICP code which do not have to be modified, specifically erase, program and verify functions which are specifically tailored to the architecture of multiple time programming module 740, are stored in space-efficient mask ROM module 760.

Referring to FIG. 7, the in-circuit programming process operates as follows: microcontroller 700 executes code from ICP communication handler 742, which communicates with an ICP initiator at a remote site across one of I/O ports 720. New instructions to be loaded into the user code section 744 of multiple time programming module 740 are transferred through one of I/O ports 720 into microcontroller 700. Microcontroller 700 executes code in erase/program/verify handler 762 within mask ROM module 760 which loads the new code into user code section 744 of multiple time programming module 740. Microcontroller 100 operates in conjunction with watchdog timer 710, which is used to detect deadlocks in microcontroller 700's execution of the in-circuit programming code. In order to program the new instructions into multiple time programming module 740, microcontroller 700 first erases a portion of multiple time programming module 740 through a sequence of instructions written into control register 752 and timing register 754. Microcontroller 700 then programs the new code into multiple time programming module 740 through additional instructions written into control register 752 and timing register 754. Finally, microcontroller 700 verifies the programming of the new code in multiple time programming module 740 through a sequence of instructions written to control register 752 and timing register 754.

Figure 8:
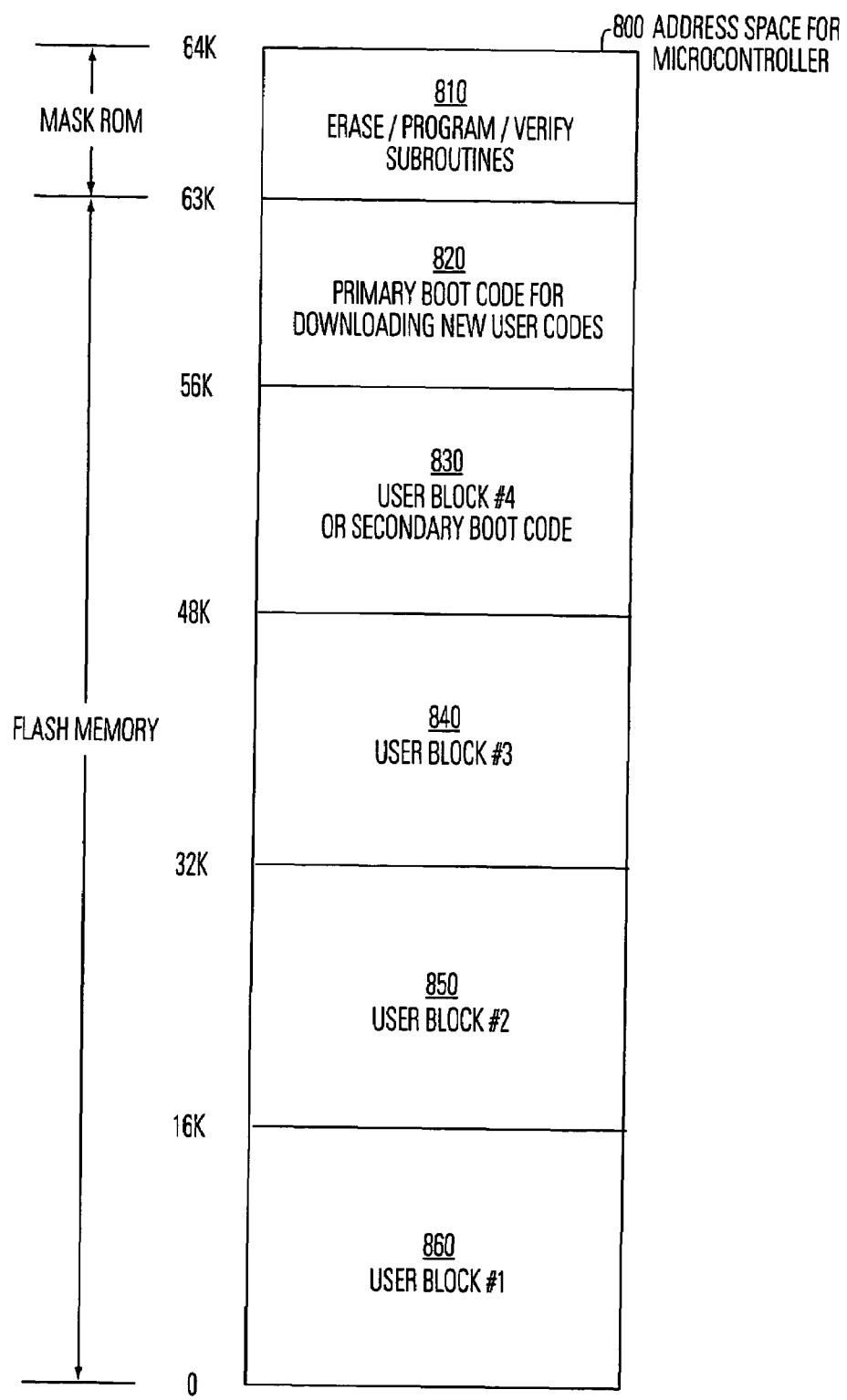
FIG. 8 is a diagram of the address space containing instructions to be executed by microcontroller 100 in accordance with an aspect of the present invention.

FIG. 8 illustrates the address space 800 viewed by microcontroller 800. This address space is divided into a plurality of independently erasable blocks of flash memory as well as a block of mask ROM memory. User block #1 860 extends from address 0 to address 16K. User block #2 850 extends from address 16K to address 32K. User block #3 840 extends from address 32K to address 48K. User block #4 830 extends from address 48K to address 56K. Primary boot code for downloading new user codes 820 is located between addresses 56K and 63K. This primary boot code is used during system boot up for downloading new instructions into user code section 744 of multiple time programming module 740. If this primary boot code space is insufficient, user block #4 830 may be used to store secondary boot code.

The address space between 63K and 64K contains erase/program/verify subroutines 810. This portion of address space 800 is located within mask ROM module 760. The other portion of address space 800 from 0 to 63K is located in flash memory cells in multiple time programming module 740. Although these two portions of address space 800 reside within different memory modules, they comprise portions of a single address space 800 for microcontroller 700. Instructions from mask ROM module 760 and multiple time programming module 740 are selectively switched into microcontroller 700 through MUX 730.

In the embodiment illustrated in FIG. 7, only a single mask ROM module 760 and a single multiple time programming module 740 are illustrated. Alternative systems include more than one mask ROM module and more than one module of flash memory cells, allowing even greater flexibility in the design and implementation of in-circuit programming instructions.

Figure 9:
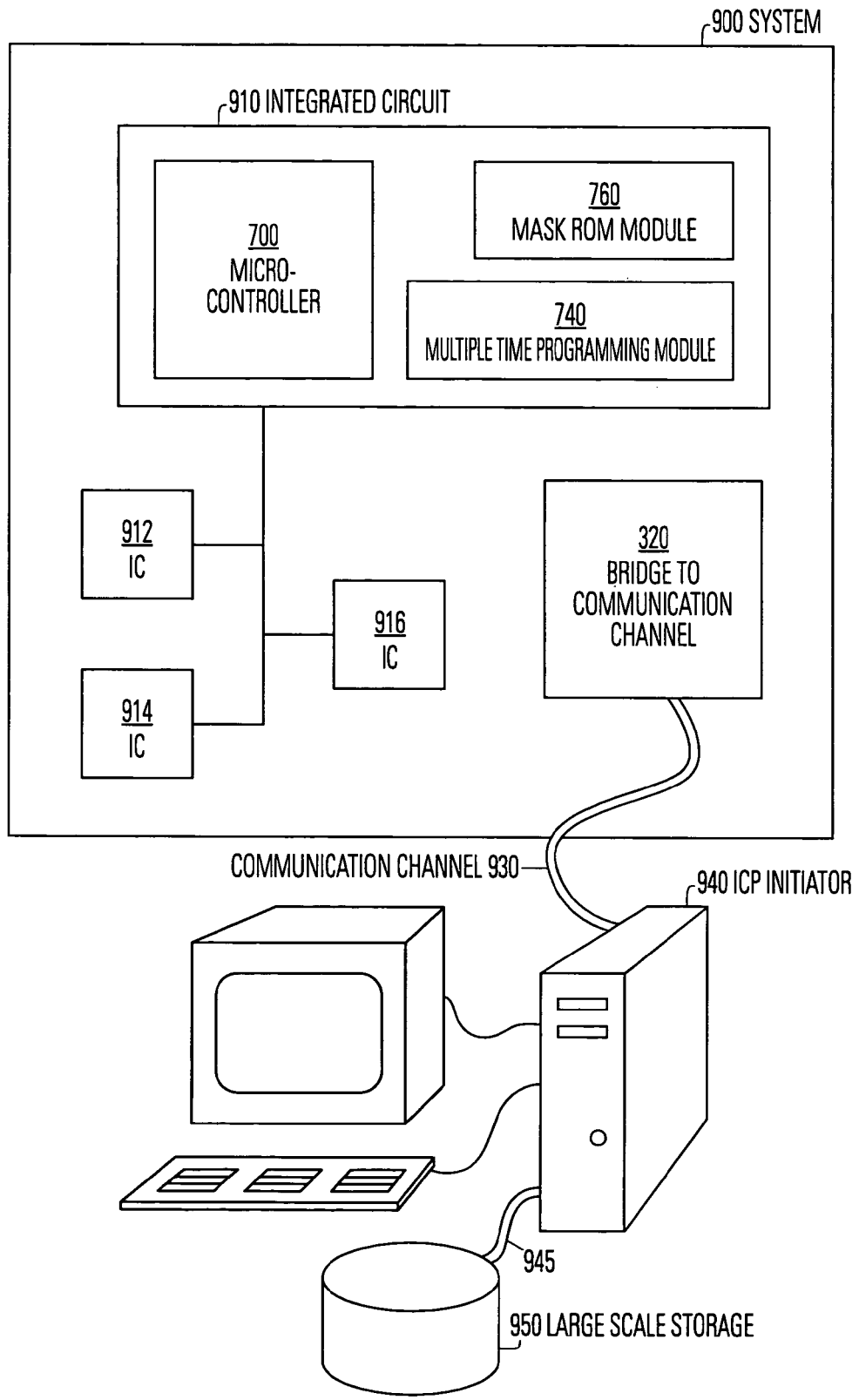
FIG. 9 is a diagram showing how the present invention is integrated into a system including a communication channel and an in-circuit programming initiator 340 in accordance with an aspect of the present invention.

FIG. 9 illustrates the application environment for the present invention. The invention is implemented on an integrated circuit 910, which is placed within system 900; system 900 comprises either a printed circuit board or some other system implementation. Integrated circuit 910 includes microcontroller 700, mask ROM module 760, and multiple time programming module 740 as well as the other components of the ICP system illustrated in FIG. 7. Microcontroller 700 is coupled to a plurality of integrated circuits (ICs) 912, 914 and 916. Bridge to communication channel 920 provides a channel across which in-circuit programming code is transferred. Bridge to communication channel 920 may comprise a simple network port, or may include extra glue logic to make the ICP system transparent to non-ICP code. The functionality of bridge to communication channel 920 can be modified, allowing bridge to communication channel 920 to be coupled to diverse ICP communication channels having different levels of data rates, error rates and complexity. For example, in one embodiment communication channel 930, comprises an Internet executing an Internet communication protocol.

Bridge to communication channel 920 is coupled through communication channel 930 to an ICP initiator 940, such as a personal computer or workstation. ICP initiator 940 is coupled by a communication channel 945 to large scale storage device 950. ICP initiator 940 can be coupled to microcontroller 700 in a variety of ways. In one embodiment, an ICP initiator 940 is a world wide web site accessed through the Internet on communication channel 930. Alternatively, ICP initiator 940 acts as the initiator across a dial-up modem link. In yet another embodiment, communication channel 930 is a communication bus in a personal computer system, and the in-circuit software is loaded across the bus 930. In this embodiment, upgrades to system 900 can be distributed to end users on floppy disks or otherwise loaded through ICP initiator 940.

In some applications, bridge to communication channel 920 is not required. Referring to FIG. 7, in some applications the software contained within ICP communication handler 742 is sufficient by itself to implement the proper protocol for ICP communications through one of I/O ports 720 across communication channel 930. This allows one of I/O ports 720 to directly connect to communication channel 930, thereby eliminating the need for bridge to communication channel 920.

Figure 10A:
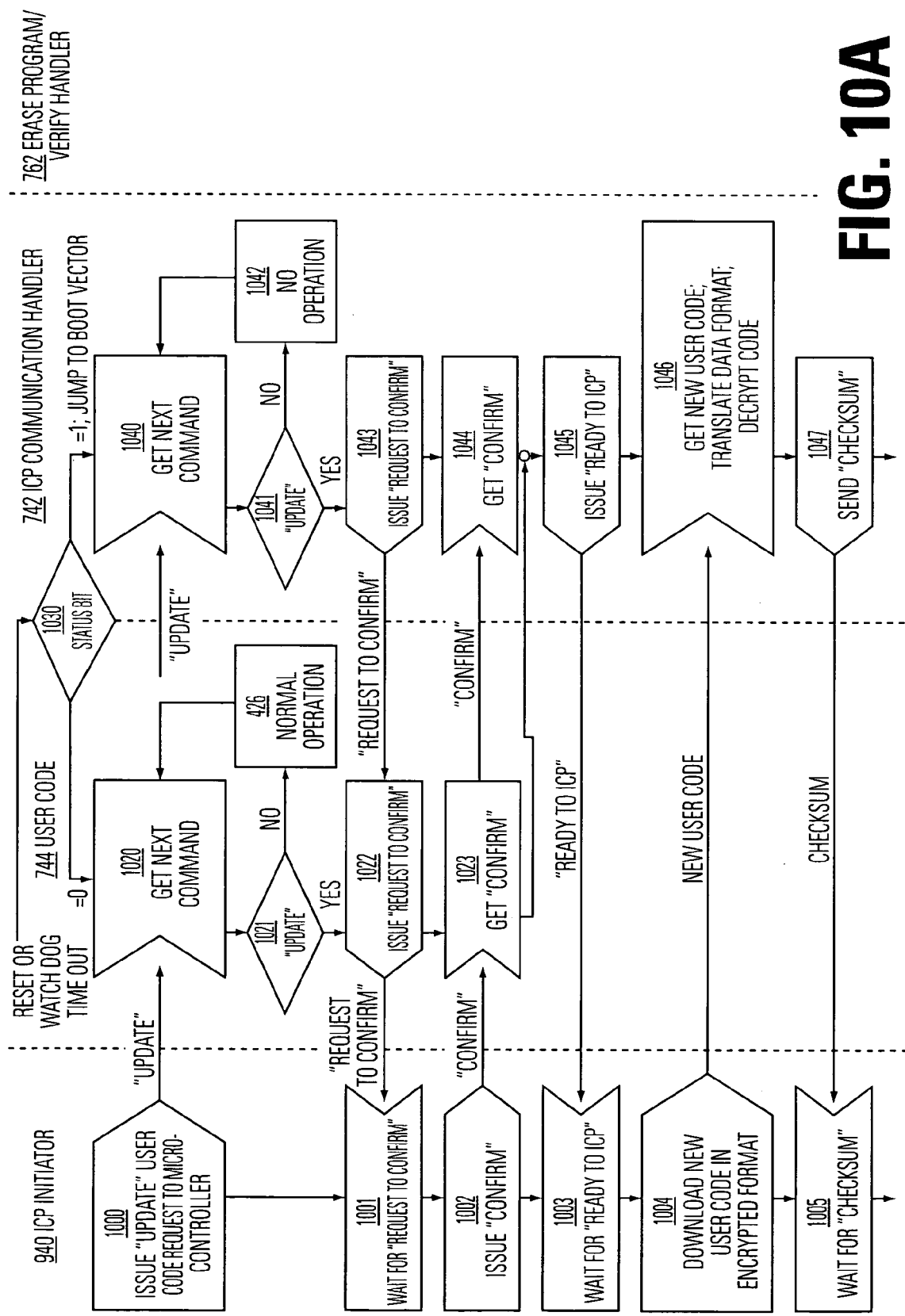
FIG. 10A is a first portion of a flow chart of the in-circuit programming process in accordance with an aspect of the present invention.
Figure 10B:
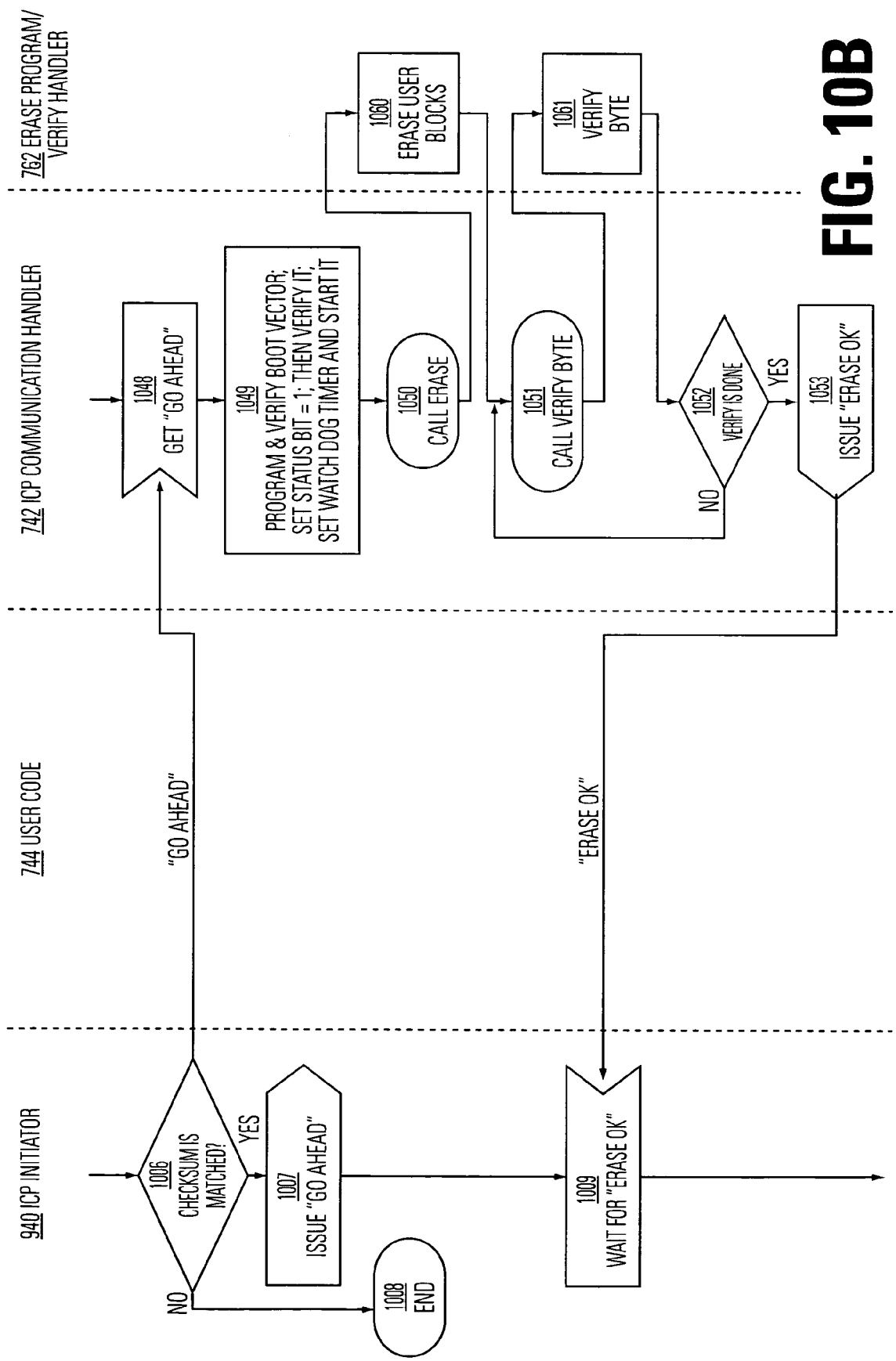
FIG. 10B is a second portion of a flow chart of the in-circuit programming process in accordance with an aspect of the present invention.
Figure 10C:
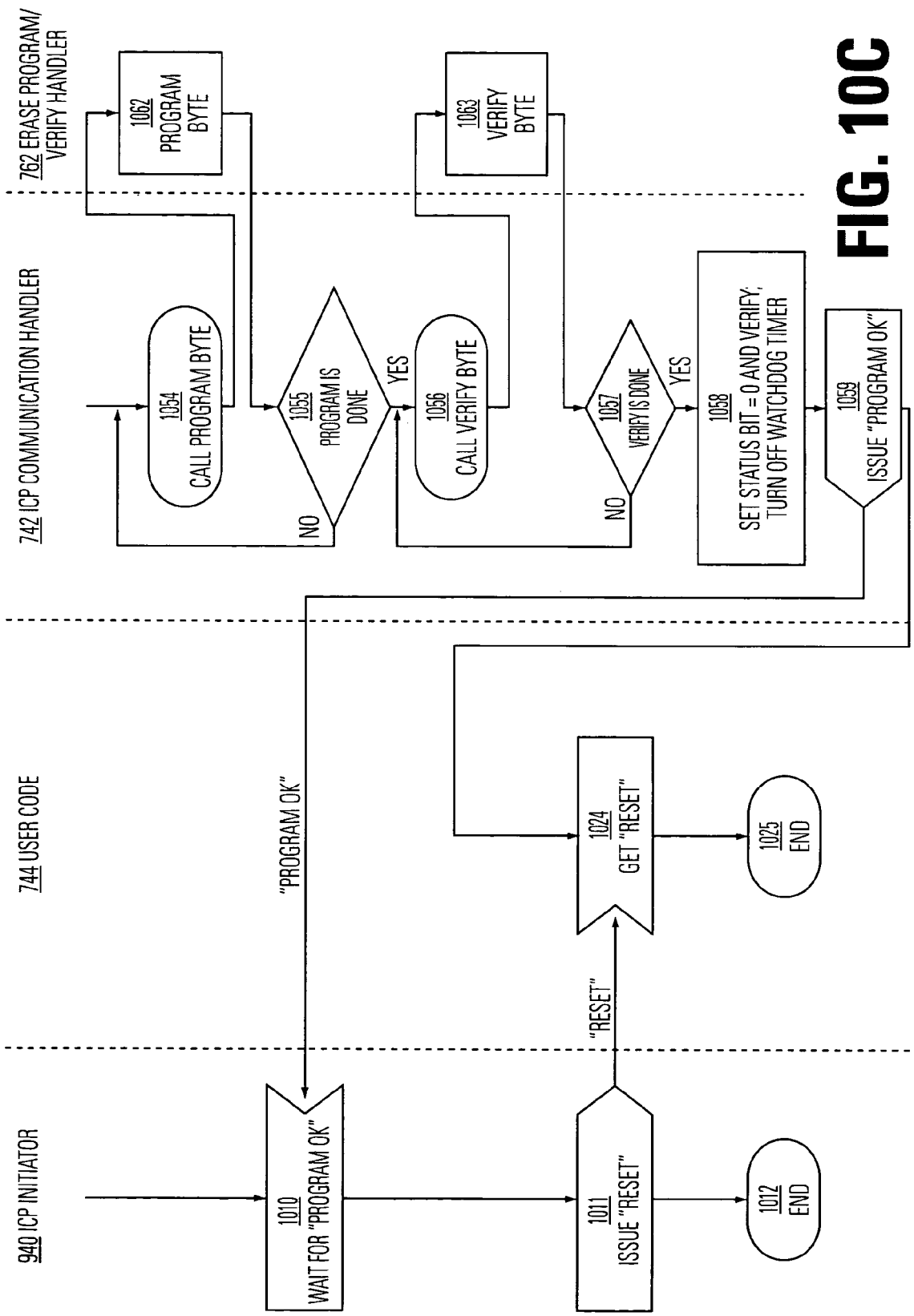
FIG. 10C is the third portion of a flow chart of the in-circuit programming process in accordance with an aspect of the present invention.

FIGS. 10A, 10B and 10C contain a flowchart of the operations involved in the in-circuit programming process. Each of the FIGS. 10A, 10B and 10C are divided into four columns. The first column, labeled "ICP Initiator 940,"

represents the activities of in-circuit programming initiator 940, which is illustrated in FIG. 9. ICP initiator 940 is a device external to integrated circuit 910 which is connected to in-circuit programming systems 900 through a communication channel 930. ICP initiator 940 initiates and controls the in-circuit programming process.

The remaining three columns of FIGS. 10A, 10B and 10C represent actions of microcontroller 700 in executing different bodies of code stored within mask ROM module 760 and multiple time programming module 740. The column labeled "user code 744" represents activities of microcontroller 700 while executing user code 744 within multiple time programming module 740. The column labeled "ICP communication handler 742" represents the actions of microcontroller 700 while executing ICP communication handler 742 within multiple time programming module 740. The column labeled "erase/program/verify handler 762" represents the actions of microcontroller 700 while executing erase/program/verify handler 762 within mask ROM module 760.

The in-circuit programming process as illustrated in FIGS. 10A, 10B and 10C operates as follows. Upon system reset or when watchdog timer 710 times out, microcontroller 710 enters state 1030 wherein a status bit is checked. If the status bit is zero, microcontroller 700 enters step 1020 within user code 744. If the status bit is set to a one, microcontroller 700 jumps to the location pointed by the boot vector and executes step 1040 within ICP communication handler 742.

At step 1020, microcontroller 700 waits to get the next command from ICP initiator 940. When ICP initiator 940 executes step 1000, it transmits an update command to microcontroller 700. This update command is received by microcontroller 700, causing it to proceed to step 1021. Step 1021, microcontroller 700 asks whether the command received was an update command. If not, microcontroller 700 proceeds to step 1026, in which normal operation of microcontroller 700 takes place, and microcontroller 700 executes non-ICP user code. The system then returns to step 1020 to get the next command. If the command was an update command, microcontroller 700 proceeds to step 1022, in which a "request to confirm" is sent to ICP initiator 940. After executing step 1000, ICP initiator 940 proceeds to step 1001 in which ICP initiator 940 waits for a request to confirm. When the request to confirm command is received, ICP initiator 940 proceeds to step 1002, in which a confirm command is transmitted to microcontroller 700. Microcontroller 700 receives this confirm command at step 1023, and proceeds to step 1045 within ICP communication handler 742, in which microcontroller 700 transmits a ready to ICP command to ICP initiator 940. After issuing the confirm command, ICP initiator 940 proceeds to step 1003, where ICP initiator 940 waits for a ready to ICP command from microcontroller 700.

If at step 1030, the status bit was set to one, microcontroller 700 executes a set of steps to confirm the ICP request within ICP communication handler 742. These steps almost precisely mirror the steps used to confirm the ICP request within user code 744 when the status bit was set to zero. At step 1040, microcontroller 700 waits for the next command from ICP initiator 940. When ICP initiator 940 executes step 1000, it transmits an update command to microcontroller 700. When this update command is received by microcontroller 700 at step 1040, microcontroller 700 proceeds to step 1041 in which microcontroller 700 determines whether the command was an update command. If not, microcontroller 700 proceeds to step 1042 in which no operation (a NOOP) takes place. Microcontroller 700 then returns to step 1040 to receive another command.

If microcontroller 700 received an update command at step 1041, it proceeds to step 1043 in which microcontroller 700 transmits a request to confirm command to ICP initiator 940. After ICP initiator 940 executes step 1000, it proceeds to step 1001 where it waits for a request to confirm command. Upon receiving the request to confirm command from microcontroller 700, ICP initiator 940 proceeds to step 1002 where it transmits a confirm command to microcontroller 700. After executing step 1043, microcontroller 700 proceeds to step 1044 where it waits for the confirm command from ICP initiator 940. Upon receiving the confirm command, microcontroller 700 proceeds to step 1045 in which microcontroller 700 transmits a "ready to ICP" command to the ICP initiator 940. After executing step 1002, ICP initiator 940 proceeds to step 1003, where it waits for a ready to ICP command from microcontroller 700.

At this point, the confirmation process for the ICP command is complete and the downloading of the new user code takes place. After executing step 1003, ICP initiator 940 proceeds to step 1004, wherein ICP initiator 940 downloads the new user code in encrypted format across communication channel 930 to microcontroller 700. At step 1046, microcontroller 700 receives the new user code, and decrypts the data format. After executing 1046, microcontroller 700 proceeds to step 1047, in which it sends a checksum to ICP initiator 940. After executing 1004, ICP initiator 940 proceeds to step 1005 where it waits for the checksum. After receiving the checksum, ICP initiator 940 proceeds to step 1006 in which it verifies whether the checksum matches the checksum of the code that was sent to microcontroller 700. If the checksum does not match, ICP initiator 940 proceeds to step 1008, which is an end state, and an error is flagged. If the checksum matches, ICP initiator 940 proceeds to step 1007 in which it issues a go ahead command. After sending the checksum at step 1047, microcontroller 700 proceeds to step 1048 in which it waits for the go ahead command.

Upon receiving the go ahead command from ICP initiator 940, microcontroller 700 proceeds to step 1049 in which the in-circuit programming commences. At step 1049, microcontroller 700 programs and verifies the boot vector and sets the status bit to 1 indicating that an ICP operation is taking place. Microcontroller 700 then verifies that the status bit is set, and proceeds to set and start watchdog timer 710. Microcontroller 700 then proceeds to step 1050 in which it calls the erase subroutine from erase/program/verify handler 762. Microcontroller 700 then proceeds to step 1060 in erase/program/verify handler 762, in which microcontroller 700 erases the specified blocks within multiple time programming module 740. Microcontroller 700 then proceeds to step 1051 within ICP communication handler 742.

At step 1051, microcontroller 700 calls the verify byte subroutine from erase/program/verify handler 762. Microcontroller then proceeds to step 1061 in which the verify byte subroutine is executed. Microcontroller 700 then proceeds to step 1052 within ICP communication handler 742. At step 1052, microcontroller 700 determines whether or not the verification of the erase operation is complete. If not, microcontroller 700 returns to step 1051 to verify the subsequent byte. If so, microcontroller 700 proceeds to step 1053 in which microcontroller 700 transmits an erase OK command to ICP initiator 940. After executing step 1007, ICP initiator 940 proceeds to step 1009 in which ICP initiator 940 waits for an erase OK command. After receiving the erase OK command, ICP initiator 940 proceeds to step 1010 where ICP initiator 940 waits for a program OK command from microcontroller 700. After issuing the erase OK command at step 1053, microcontroller 700 proceeds to step 1054 in which microcontroller 700 calls the program byte subroutine from erase/program/verify handler 762. Microcontroller 700 then proceed to step 1062 in which the program byte subroutine is executed. Microcontroller 700 next advances to step 1055 within ICP communication handler 742. At step 1055, microcontroller 700 determines whether the programming is finished. If not, microcontroller 700 returns to step 1054 to call the program byte command for the subsequent byte to be programmed. If the programming is complete, microcontroller 700 proceeds to step 1056 in which the verify byte subroutine is called. Microcontroller 700 then proceeds to the verify byte subroutine at step 1063 within erase/program/verify handler 762. At step 1063, the verify byte subroutine is executed. Microcontroller 700 then proceeds to step 1057 within ICP communication handler 742. At step 1057, microcontroller 700 determines whether the verify operation is complete. If not, microcontroller 700 returns to step 7056, where the verify byte subroutine is called for a subsequent byte to be verified. If the verification operation is complete, microcontroller 700 proceeds to step 1058.

At step 1058, the erase, program and verify operations for the in-circuit programming are complete. Microcontroller 700 sets the status bit to 0 and verifies that it is set to 0. It then turns off watchdog timer 710. Microcontroller 700 then proceeds to step 1059 in which it issues a program OK command to ICP initiator 940. ICP initiator 940 receives the program OK command at step 1010 and proceeds to step 1011 in which ICP initiator 940 transmits a reset command to microcontroller 700. After issuing the program OK command at step 1059, microcontroller 700 proceeds to step 1024 within user code 744 in which it waits for a reset command. When a reset command is received from ICP initiator 940, microcontroller 700 proceeds to step 1025 which is an end state. After issuing the reset command at step 1011, ICP initiator 940 proceeds to step 1012 which is also an end state. At this point the in-circuit programming process is complete. This process will be repeated when a new in-circuit programming process is initiated by ICP initiator 940.

Using the architecture illustrated in FIG. 7, designers of systems can adapt the in-circuit programming code to their particular environment. Thus, a manufacturer selects an integrated circuit, as shown in FIG. 7, for implementation in their circuit. If the in-circuit programming code is not ready, microcontroller 700 is utilized and the variety of communication ports available on the chip 900 are used to minimize the extra logic required on the circuit board to match the system to a particular in-circuit programming environment. First, the proper connections and protocol for in-circuit programming are selected by the designer. Next, the ICP code for the selected environment is developed and improved. The ICP code is then integrated with the programs to be executed during normal operation of the system. Next, the integrated ICP code and user code are stored in the flash memory of multiple time programming module 740. Then, the erase and program operations are verified. Microcontroller 710, including the integrated ICP code, is then placed inside the system. Next, the ICP code is executed and tested. If the system works well, the system is mass produced. If the ICP code needs modification, then the ICP process is repeated to optimize the ICP code. Similarly, the system code is optimized using the same programming techniques.

The end user of the system thus obtains robust in-circuit programming code embedded in microcontroller 700, which can be updated and modified on the fly using the interactive in-circuit programming techniques according to the present invention.

Accordingly, the present invention provides a flexible flash memory-based microcontroller architecture which allows for diverse in-circuit programming applications. For example, televisions or video monitors, digital video disks or CD-ROMs, remote control devices or mobile telephones may include microcontrollers with in-circuit programming structures according to the present invention. Various sources of updated ICP code can then be loaded into respective devices using the flexible architecture of the present invention. The present invention can be thereby modified or adapted for a particular application environment. Very little or no glue logic is required in order to support the in-circuit programming structures. Furthermore, the power of the microcontroller associated with the in-circuit programming can be leveraged to simplify the design of flash memory for the in-circuit programming system.

Silicon real estate on the integrated circuit is conserved by storing integrated circuit-specific portions of the ICP code, which are not likely to change, in space efficient mask ROM cells. Other parts of the ICP code, such as the communication handler, which are likely to be modified frequently are maintained in flash memory. In this way, silicon real estate can be saved while maintaining the flexibility to tailor the in-circuit programming system for a wide variety of different applications.

The foregoing description of the preferred embodiments of the invention have been presented for purposes of illustration and description only. They are not intended to be exhaustive or to limit the invention to the precise forms disclosed. Obviously, many modifications and variations will be apparent to practitioners skilled in the art. It is intended that the scope of the invention be defined by the following claims and their equivalents.

APPENDIX A

```
;© 1996 Macronix International Co., Ltd.
;
;SFR define
        .EQU    FMCON, 0 × 40 H       ;Flash Module CONtrol
                                       register
        .EQU    FMTIM, 0 × 41 H       ;Flash Module TIMing
                                       register
                                      ;used by s/w to emulate the
                                       emulate
                                      ;the waveform needed for
                                       flash operations
        .EQU    delay1, 0 × fah       ;Tck = 1/Fosc (ns)
                                      ;delay1 = (256–2000/
                                       (Tck*12) + 1)
        .EQU    delay2, 01 × 1AH      ;delay2 = (500000000/
                                       Tck*12 * 65536)
;Subroutine: Erase full chip
ERASE:
        MOV     FMCON, #00010010 b    ;chip erase
        MOV     FMTIM, #11000000 b    ;VPP in and CEB is active
        LCALL   DELAY2 us             ;delay tVPS or tCES (2 us)
        MOV     FMTIM, #11010000 b    ;WEB is active
        LCALL   DELAY1 s              ;delay tEW (erase time)
        MOV     FMTIM, #11000000 b    ;disable WEB
        LCALL   DELAY500 ms           ;delay tER (0.5 s)
        MOV     FMTIM, #00000000 b    ;clear FMTIM
        MOV     FMCON, #00000000 b    ;clear FMCON
        RET
;Subroutine: Verify erased byte
ERASE_VERIFY:
        MOV     FMCON, #00010010 b    ;verify chip erase
        MOV     FMTIM, #11000000 b    ;VPP in, CEB is active
```

APPENDIX A-continued

```
          MOV     DPTR, #00 H              ;Address
          LCALL   DELAY2 us                ;delay tMS (2 us)
          MOV     FMTIM, #11100000 b       ;OEB is active
          MOV     R1, #00 h
          MOV     R0, #00 H
          NOP
          NOP
LOOP_E:
;MOVX     A,@DPTR                          ;read Flash
          CJNE    A,#0 × FFH, ERASE_FAIL
          INC     DPTR
          DJNZ    R0, LOOP_E
          DJNZ    R1, LOOP_E
          MOV     R7, #0 × ffh             ;erase verify passed
          SJMP    END_EV
ERASE_FAIL:
          MOV     R7, A                    ;erase verify fail
END_EV
          MOV     FMTIM, #0000000 b        ;clear FMTIM
          MOV     FMCON, #0000000 b        ;FMCON
          RET
;Subroutine: Program byte
;DPTR: program address
;A: program data
PROGRAM_B:
          MOV     FMCON, #00010001 b       ;program byte
          LCALL   PROGRAM
          MOV     FMCON, #00000000 b       1 clear FMCON
          RET
;Subroutine Verify Byte
;DPTR: verify address
;A: verify data
VERIFY_B:
          MOV     FMCON, #00010011 b       ;verify byte
          MOV     FMTIM, #110000000 b      ;VPP in, CEB active
          MOV     B, A
          LCALL   DELAY2 us                ;delay tPV(2 us)
          MOV     FMTIM, #11100000 b       ;OEB is active
          NOP                              ;delay 4 NOP
          NOP
          NOP
          NOP
          CJNE    A,B,VERIFY_B_FAIL
          MOV     R7, #0 × FFH             ;verify passed
          SJMP    END_PV
VERIFY_B_FAIL
          MOV     R7, A                    ;program verify fail
END_PV:
          MOV     FMTIM, #00000000 b       ;clear FMTIM
          MOV     FMCON, #00000000 b       ;clear FMCON
          RET
;Subroutine: Program LOCK bits
;which lock bit being programmed depends on DPTR [2:0]
PROGRAM_L:
          MOV     FMCON, #00010100 b       ;program LOCK bit
          LCALL   PROGRAM
          MOV     FMCON, #00000000 b       ;clear FMCON
          RET
;Subroutine: Verify LOCK bits
VERIFY_L:
          MOV     FMCON, #00010101 b       ;verify three programmed
                                            lock bits
          LCALL   VERIFY_L_S
          MOV     FMCON, #00000000 b       ;clear FMCON
          RET
;Subroutine: Program Status bit
PROGRAM_S:
          MOV     FMCON, #00010110 b       ;program State bit
          LCALL   PROGRAM
          MOV     FMCON, #00000000 b       ;clear FMCON
          RET
;Subroutine: Verify programmed status bit
VERIFY_S:
          MOV     FMCON, #00010111 b       ;verify state bit
          LCALL   VERIFY_L_S
          MOV     FMCON, #00000000 b       ;clear FMCON
          RET
```

APPENDIX A-continued

```
;Subroutine: PROGRAM
PROGRAM:
          MOV     FMTIM, #11000000 b       ;VPP in, CEB active
          LCALL   DELAY2 us                ;delay tVPS or tCES or
                                            tMS (2 us)
          MOV     FMTIM, #11010000 b       ;WEB is active
          LCALL   DELAY100 us              ;delay tPW(100 us)
          MOV     FMTIM, #11000000 b       ;disable WEB
          LCALL   DELAY2 us                ;delay tPR (2 us)
          MOV     FMTIM, #00000000 b       ;clear FMTIM
          RET
;Subroutine: Verify LOCK bits or State bit
VERIFY_L_S:
          MOV     B,A
          MOV     FMTIM, #01000000 b       ;VPP = 5 V, CEB active
          LCALL   DELAY2 us                ;delay tVPS or tCES or
                                            tMS (2 us)
          MOV     FMTIM, #11100000 b       ;OEB is active
          NOP
          NOP
          NOP
          NOP
          CJNE    A,B,VERIFY_LS_FAIL
          MOV     R7, #0 × ffh             ;verify LOCK or State bit
                                            passed
          SJMP    END_VLS
VERIFY_LS_FAIL:
          MOV     R7,A                     ;verify LOCK or state
                                            fail
END_VLS:
          MOV     FMTIM, #00000000 b       ;clear FMTIM
          RET
;Subroutine: DELAY2 us
DELAY2 us:
          PUSH    IE
          CLR     EA
          MOV     TH1, #0 × FFH
          MOV     TL1, #delay1
          MOV     TCON, #00 H
          MOV     TMOD, #10 H              ;TIMER1, MODE 1
          SETB    TR1                      ;start TIMER1
LOOP1:    JNB     TF1, LOOP1
          MOV     TCON, #00 H              ;clear TF1 and TR1
          POP     IE
          RET
;Subroutine: DELAY100 us
DELAY100 us
          MOV     R7, #0 × 32 H
LOOP2:    LCALL   DELAY2 us
          DJNZ    R7, LOOP2
          RET
;Subroutine: DELAY500 ms
DELAY500 ms:
          PUSH    IE
          CLR     EA
          MOV     R7, #delay2
          MOV     TCON, #00 H
          MOV     TMOD, #10 H              ;TIMER1, MODE 1
LOOP4:    MOV     TH1, #00 H
          MOV     TL1, #00 H
          SETB    TR1
LOOP3:    JNB     TF1, LOOP3
          MOV     TCON, #00 H              ;clear TF1 and TR1
          DJNZ    R7, LOOP4
          POP     IE
          RET
;Subroutine: DELAY1 s
DELAY1 s:
          LCALL   DELAY500 ms
          LCALL   DELAY500 ms
          RET
          .END
```

What is claimed is:

1. A method of providing for error recovery on an integrated circuit, comprising:

providing an in-circuit programming status on the integrated circuit having an initial value;

initiating an in-circuit programming process, with a watchdog timer running; when the in-circuit programming process successfully terminates, changing the in-circuit programming status to a changed value; and during initialization of the integrated circuit, executing a first boot code sequence on the integrated circuit if the in-circuit programming status has the initial value, the first boot code sequence being programmable through the in-circuit programming process, and executing a second boot code sequence on the integrated circuit if the in-circuit programming status has the changed value, the second boot code sequence not being modified during the in-circuit programming process.

2. The method of claim 1, wherein the first boot code sequence is an application program and the second boot code sequence is a mini-boot program.

3. The method of claim 1, wherein the second boot code sequence is loaded on the integrated circuit as delivered by a manufacturer.

4. An apparatus for in-circuit programming of an integrated circuit, comprising: a processor on the integrated circuit which executes instructions;

an external port on the integrated circuit through which data is received from an external source;

a first memory array comprising in-circuit modifiable, non-volatile memory cells on the integrated circuit, which stores instructions for execution by the processor, including a set of instructions for controlling transfer of instructions into the integrated circuit from the external source through the external port; and a second memory array on the integrated circuit, which stores instructions for execution by the processor that are not to be modified by the set of instructions for controlling transfer of instructions into the integrated circuit from the external source, including a set of instructions for controlling the steps of erasing, programming and verifying the instructions in the first memory array.

5. The integrated circuit of claim 4, wherein said first set of instructions includes a first boot program of instructions, and the second set of instructions includes a second boot program of instructions.

6. In an integrated circuit including a processor and an external port, a method for in-circuit programming of the integrated circuit, comprising:

providing on the integrated circuit a first memory array comprising non-volatile memory cells, and a second memory array to store instructions that are not to be modified by in-circuit programming;

receiving an in-circuit program command from an initiator external to the integrated circuit;

in response to the in-circuit program command, using the processor to execute a set of instructions for controlling the in-circuit programming steps of erasing, programming and verifying instructions in the first memory array; and using the processor to execute a set of instructions from the first memory array to control the transfer of a set of instructions into the integrated circuit from an external source through the external port.

7. The integrated circuit of claim 6, including a store on the substrate holding first and second boot vectors, the first boot vector pointing to the first boot program of instructions, and the second boot vector pointing to the second boot program of instructions.

8. The integrated circuit of claim 6, including a status indicator which indicates status of an instance of transferring instructions into the modifiable non-volatile memory from an external source.

9. An integrated circuit-on a substrate, including a processor which executes instructions, and comprising:

memory on the substrate to store instructions for execution by the processor, comprising modifiable non-volatile memory;

a first set of instructions stored in the memory, the first set of instructions being protected from modification by the processor, and including instructions for controlling erasing, programming and verifying instructions in the modifiable non-volatile memory;

a second set of instructions stored in the memory and accessible by the processor, the second set of instructions being modifiable by the processor, and including a set of instructions for controlling transfer of instructions into the modifiable non-volatile memory on the substrate from an external source; and a watchdog timer on the substrate, which operates during execution of the set of instructions for controlling transfer of instructions into the modifiable non-volatile memory from an external source.

10. An integrated circuit on a substrate, including a processor which executes instructions, and comprising:

memory on the substrate to store instructions for execution by the processor, comprising modifiable non-volatile memory;

a first set of instructions stored in the memory, the first set of instructions being protected from modification by the processor, and including instructions for controlling erasing, programming and verifying instructions in the modifiable non-volatile memory and a first boot program of instructions in the modifiable non-volatile memory;

a second set of instructions stored in the memory and accessible by the processor, the second set of instructions being modifiable by the processor, and including a set of instructions for controlling transfer of instructions into the modifiable non-volatile memory on the substrate from an external source which call the instructions for controlling erasing, programming and verifying instructions in the modifiable non-volatile memory, and a second boot program of instructions; and a watchdog timer on the substrate, which operates during execution of the set of instructions for controlling transfer of instructions into the modifiable non-volatile memory from an external source;

a status indicator which indicates status of an instance of transferring instructions into the modifiable non-volatile memory from an external source, and a store on the substrate holding first and second boot vectors, the first boot vector pointing to the first boot program of instructions, and the second boot vector pointing to the second boot program of instructions, and logic responsive to the watchdog timer to signal a reset, and in response to the reset, to select one of the first boot vector or the second boot vector in response to the status indicator.

11. An integrated circuit device adapted to in-circuit programming or reprogramming of a non-volatile memory, including:
- a processor;
- a programmable, non-volatile memory coupled to the processor;
- an in-circuit programming status indicator coupled to the processor;
- a default boot address and at least one boot vector, selectable by the processor; first logic on the integrated circuit device
- to set the status indicator to an incomplete value at a beginning of an in-circuit programming process to program the non-volatile memory,
- to set the status indicator to a complete value after successful completion of the in-circuit programming process, and
- to select among the default boot address and the boot vector based on the value to which the status indicator is set; and
- second logic on the integrated circuit device to protect the status indicator from being modified during the in-circuit programming process.

12. The device of claim 11, wherein the processor, the non-volatile memory, the in-circuit programming status indicator, the default boot address, the boot vector and the first and second logics are combined on a single integrated circuit.

13. An integrated circuit device with a timer adapted to in-circuit programming or reprogramming of a non-volatile memory in communication with an external source, including:
- a processor;
- a programmable, non-volatile memory coupled to the processor;
- a timer, coupled to the processor,
- having a timeout value set by the external source to control an in-circuit programming process to program the non-volatile memory, and generating a reset signal;
- an in-circuit programming status indicator coupled to the processor;
- a default boot address, selectable by the processor;
- at least one boot vector, coupled to and selectable by the processor; and logic on the integrated circuit device
- to set the status indicator to an incomplete value at a beginning of the in-circuit programming process,
- to set the status indicator to a complete value after a successful completion of the in-circuit programming process, and
- to select' among the default boot address and the boot vector based on the value to which the status indicator is set.

14. The device of claim 13, wherein the processor, the non-volatile memory, the timer, the in-circuit programming status indicator, the default boot address, the boot vector and the first logic are combined on a single integrated circuit.

15. An integrated circuit device adapted to in-circuit programming or reprogramming of a non-volatile, memory, including:
- a processor;
- a programmable, non-volatile memory coupled to the processor;
- wherein the non-volatile memory has an initial location;
- an in-circuit programming status indicator coupled to the processor;
- at least one boot vector, selectable by the processor;
- first logic on the integrated circuit device
- to set the status indicator to an incomplete value at a beginning of an in-circuit programming process to program the non-volatile memory,
- to set the status indicator to a complete value after successful completion of the in-circuit programming process, and
- to select between the initial location and the boot vector based on the value to which the status indicator is set; and
- second logic on the integrated circuit device to protect the status indicator from being modified during the in-circuit programming process.

16. The device of claim 15, wherein the processor, the non-volatile memory, the in-circuit programming status indicator, the boot vector and the first and second logics are combined in a single integrated circuit.

17. A integrated circuit device with a timer adapted to in-circuit programming or reprogramming of a non-volatile memory in communication with an external processor, including:
- a processor;
- a programmable, non-volatile memory coupled to the processor;
- wherein the non-volatile memory has an initial location;
- a timer, coupled to the processor,
- having a timeout value received from the external processor to control an in-circuit programming process to program the non-volatile memory, and
- having a processor reset;
- an in-circuit programming status indicator coupled to the processor;
- at least one boot vector, coupled to and selectable by the processor; and logic on the integrated circuit device
- to set the status indictor to an incomplete value at a beginning of the in-circuit programming process,
- to set the status indicator to a complete value after a successful completion of the in-circuit programming process, and
- to select between the initial location and the boot vector based on the value to which the status indicator is set.

18. The device of claim 17, wherein the processor, the non-volatile memory, the timer, the in-circuit programming status indicator, the boot vector and the first logic are combined on a single integrated circuit.

* * * * *

UNITED STATES PATENT AND TRADEMARK OFFICE
CERTIFICATE OF CORRECTION

PATENT NO.       : 7,237,145 B2                                    Page 1 of 1
APPLICATION NO.  : 10/408591
DATED            : June 26, 2007
INVENTOR(S)      : Albert C. Sun, Chee H. Lee and Chang L. Chen It is certified that error appears in the above-identified patent and that said Letters Patent is hereby corrected as shown below:

In claim 6, column 25, line 8, cancel "lop" and replace with -- top --.

In claim 13, column 25, line 31, cancel "Sc" and replace with -- Se --.

In claim 20, column 26, line 43, after the word "columns" delete the word "of".

Signed and Sealed this

Twenty-seventh Day of November, 2007

JON W. DUDAS
*Director of the United States Patent and Trademark Office*